(12) United States Patent
Zhao et al.

(10) Patent No.: US 12,314,049 B2
(45) Date of Patent: May 27, 2025

(54) SELF-MOVING DEVICE AND AUTOMATIC WORKING SYSTEM THEREOF

(71) Applicant: Positec Power Tools (Suzhou) Co., Ltd, Jiangsu (CN)

(72) Inventors: Fengli Zhao, Jiangsu (CN); Xiahong Zha, Jiangsu (CN); Xiaoqing Zhou, Jiangsu (CN)

(73) Assignee: Positec Power Tools (Suzhou) Co., LTD, JiangSu (CN)

( * ) Notice: Subject to any disclaimer, the term of this patent is extended or adjusted under 35 U.S.C. 154(b) by 867 days.

(21) Appl. No.: 17/275,159

(22) PCT Filed: Sep. 12, 2019

(86) PCT No.: PCT/CN2019/105563
§ 371 (c)(1),
(2) Date: Apr. 21, 2021

(87) PCT Pub. No.: WO2020/052619
PCT Pub. Date: Mar. 19, 2020

(65) Prior Publication Data
US 2021/0352843 A1 Nov. 18, 2021

(30) Foreign Application Priority Data

Sep. 12, 2018 (CN) .......................... 201811064195.0
Jul. 2, 2019 (CN) .......................... 201910591030.7

(51) Int. Cl.
*G05D 1/00* (2024.01)
*A01D 34/00* (2006.01)
(Continued)

(52) U.S. Cl.
CPC ......... *G05D 1/0011* (2013.01); *A01D 34/008* (2013.01); *G05D 1/0022* (2013.01);
(Continued)

(58) Field of Classification Search
CPC .... G05D 1/011; G05D 1/0022; G05D 1/0077; G05D 2201/0208; H04B 17/318;
(Continued)

(56) References Cited

U.S. PATENT DOCUMENTS 5,572,856 A    11/1996  Ku
7,677,344 B2*  3/2010   Medina ..................... B62D 1/00
                                            180/65.285
(Continued)

FOREIGN PATENT DOCUMENTS

CN    101135911 A    3/2008
CN    101727217 A    6/2010
(Continued)

OTHER PUBLICATIONS

First Office Action in CN application No. CN201980040394.4, dated Apr. 29, 2022.
(Continued)

*Primary Examiner* — Arpad Fabian-Kovacs
(74) *Attorney, Agent, or Firm* — Lee & Hayes, P.C.

(57) ABSTRACT

A self-moving device, moving and working in a working area, includes: a housing; a moving module, mounted to the housing, and configured to drive the housing to move; a main working module, mounted to the housing, and configured to perform a main working task; an auxiliary working module, mounted to the housing, and configured to perform an auxiliary working task; a control module, configured to control the moving module, the main working module, and the auxiliary working module. The self-moving device includes a wireless communication module, configured to receive a control signal generated by user operation. The self-moving device includes an automatic working mode and an auxiliary working mode, in the auxiliary working mode, the control module controls the auxiliary working (Continued)

module at least based on the control signal to work; the control module controls the auxiliary working module based on an interruption of the control signal to stop working.

19 Claims, 15 Drawing Sheets

(51) Int. Cl.
| | |
|---|---|
| *H04B 17/318* | (2015.01) |
| *H04W 4/02* | (2018.01) |
| *H04W 4/44* | (2018.01) |
| *A01B 51/00* | (2006.01) |
| *A01D 101/00* | (2006.01) |
| *B25J 15/02* | (2006.01) |

(52) U.S. Cl.
CPC ......... *G05D 1/0077* (2013.01); *H04B 17/318* (2015.01); *H04W 4/023* (2013.01); *H04W 4/44* (2018.02); *A01B 51/00* (2013.01); *A01D 2101/00* (2013.01); *B25J 15/0206* (2013.01)

(58) Field of Classification Search
CPC ........ H04W 4/023; H04W 4/44; A01B 51/00; A01D 34/008; A01D 34/84; A01D 43/16; A01D 2101/00; B25J 15/0206
See application file for complete search history.

(56) References Cited

U.S. PATENT DOCUMENTS

| | | | | |
|---|---|---|---|---|
| 8,783,005 | B1* | 7/2014 | Bernard | A01D 34/84 |
| | | | | 56/13.7 |
| 2002/0156556 | A1 | 10/2002 | Ruffner | B60L 3/106 |
| | | | | 318/587 |
| 2011/0190931 | A1 | 8/2011 | Anderson et al. | |
| 2013/0096717 | A1 | 4/2013 | Yoon et al. | |
| 2014/0102061 | A1* | 4/2014 | Sandin | B60L 3/0023 |
| | | | | 901/1 |
| 2016/0022108 | A1 | 1/2016 | Yoon et al. | |
| 2017/0168501 | A1* | 6/2017 | Ogura | G05D 1/0038 |
| 2017/0322550 | A1* | 11/2017 | Yokoyama | A01B 69/00 |
| 2018/0206402 | A1 | 7/2018 | Ran et al. | |
| 2018/0352731 | A1* | 12/2018 | Hans | A01D 43/16 |
| 2020/0029496 | A1* | 1/2020 | Nam | G05D 1/0274 |
| 2020/0206896 | A1* | 7/2020 | Wong | A01B 51/00 |
| 2020/0247652 | A1* | 8/2020 | Okamoto | G05D 1/0214 |
| 2020/0341461 | A1* | 10/2020 | Yokoyama | A01B 69/008 |

FOREIGN PATENT DOCUMENTS

| | | | |
|---|---|---|---|
| CN | 201557390 U | 8/2010 | |
| CN | 201876687 U | 6/2011 | |
| CN | 103054519 A | 4/2013 | |
| CN | 205232803 U | 5/2016 | |
| CN | 106452600 A | 2/2017 | |
| CN | 106561148 A | 4/2017 | |
| CN | 106717467 A | 5/2017 | |
| CN | 106717478 A | 5/2017 | |
| CN | 106717479 A | 5/2017 | |
| CN | 206355002 U | 7/2017 | |
| CN | 107807647 A | 3/2018 | |
| CN | 109104979 A | 1/2019 | |
| DE | 212016000020 U1 | 6/2017 | |
| EP | 2583608 A2 | 4/2013 | |
| EP | 2 547 193 B1 | 3/2017 | |
| EP | 2 013 671 B1 | 4/2018 | |
| EP | 3366108 A1 | 8/2018 | |
| EP | 3 412 128 A1 | 12/2018 | |
| EP | 3417757 A1 | 12/2018 | |
| EP | 2939513 B1 * | 11/2019 | ........... A01D 34/008 |
| EP | 3571915 A1 * | 11/2019 | ........... A01D 34/008 |
| EP | 3412129 B1 * | 8/2020 | ........... A01D 34/006 |
| KR | 10-2013-0042422 A | 4/2013 | |
| KR | 20150125508 A | 11/2015 | |
| WO | 2015040987 A1 | 3/2015 | |
| WO | 2017/063539 A1 | 4/2017 | |
| WO | WO-2018224678 A1 * | 12/2018 | ........... A01B 69/008 |
| WO | WO-2019228461 A1 * | 12/2019 | ........... A01D 34/008 |
| WO | WO-2021038240 A1 * | 3/2021 | ........... A01D 34/416 |
| WO | WO-2021096722 A1 * | 5/2021 | ........... A01D 34/008 |

OTHER PUBLICATIONS

First search in CN application No. CN201980040394.4, dated Apr. 29, 2022.
Third search in CN application No. CN201980040394.4, dated Apr. 28, 2023.
International Search Report in application No. PCT/CN2019/105563, dated Dec. 4, 2019.
Written Opinion in application No. PCT/CN2019/105563, dated Dec. 4, 2019.

* cited by examiner

SELF-MOVING DEVICE AND AUTOMATIC WORKING SYSTEM THEREOF

This application is a National Stage Application of International Application No. PCT/CN2019/105563, filed on Sep. 12, 2019, which claims benefit of and priority to Chinese Patent Application No. 201811064195.0, filed on Sep. 12, 2018 and Chinese Patent Application No. 201910591030.7, filed on Jul. 2, 2019, all of which are hereby incorporated by reference in their entirety for all purposes as if fully set forth herein.

BACKGROUND

Technical Field

The present invention relates to a self-moving device and an automatic working system thereof.

Related Art

With the development of science and technology, intelligent self-moving devices become popular. Self-moving devices can automatically perform preset related tasks through preset programs without manual operation and intervention, and are therefore widely applied to industrial applications and household products. The industrial applications include a robot that performs various functions, and the applications in household products include, for example, a lawn mower and a vacuum cleaner. These intelligent self-moving devices greatly save people's time, and bring significant convenience to industrial production and household life.

A robotic mower is used as an example. The robotic mower usually performs autonomous movement and cutting in a specified working area. The working area may be an area defined by a boundary line, or may be a working area defined by a beacon, or may be a working area defined in a map manner or the like without setting an actual physical boundary. The robotic mower includes a cutting system. A protective cover is disposed on a periphery of the cutting system to prevent the cutting system from injuring an operator. The cutting system includes a cutting member. The cutting member is usually a blade. To prevent a user from injury, in one case, the protective cover is disposed on a periphery of a metal blade, and there is a particular distance between the protective cover and a periphery of the robotic mower. In this way, there is a relatively large distance between an end of the metal blade and a profile of the periphery of the robotic mower. In another case, the distance between the metal blade and the profile of the periphery of the robotic mower can prevent the user from touching the metal blade. In this way, the distance between the end of the metal blade and the profile of the periphery of the robotic mower is larger. That is, during cutting work, there may be uncuttable areas between the end of the metal blade and a boundary of a working area or obstacles such as a wall corner, a fence, and a step.

SUMMARY

To overcome the deficiency in the prior art, a problem to be resolved by the present invention is to provide a self-moving device that has an auxiliary working capability and works safely.

A technical solution used in the present invention to resolve the problem in the prior art is: a self-moving device, moving and working in a working area, and comprising: a housing; a moving module, mounted to the housing, and configured to drive the housing to move; a main working module, mounted to the housing, and configured to perform a main working task; an auxiliary working module, mounted to the housing, and configured to perform an auxiliary working task; and a control module, configured to control the moving module, the main working module, and the auxiliary working module; the self-moving device comprises a wireless communication module, configured to receive a control signal generated from an operation of a user; and the self-moving device comprises an automatic working mode and an auxiliary working mode, wherein in the auxiliary working mode, the control module controls the auxiliary working module at least based on the control signal to work; and the control module controls the auxiliary working module based on an interruption of the control signal to stop working.

In one of embodiments, the interruption of the control signal comprises that a time that the wireless communication module stops receiving the control signal is greater than a preset interruption time.

In one of embodiments, the preset interruption time is less than or equal to 3 seconds.

In one of embodiments, in the auxiliary working mode, if determining that a distance between a signal source of the control signal and the wireless communication module is greater than or equal to a first preset distance, the control module controls the auxiliary working module to stop working.

In one of embodiments, the first preset distance is less than or equal to 20 meters.

In one of embodiments, in the auxiliary working mode, if the distance between the signal source and the wireless communication module is greater than a second preset distance, the control module controls the auxiliary working module to reduce a working speed, to enable working energy of the auxiliary working module to be less than preset energy; and the second preset distance is less than the first preset distance.

In one of embodiments, the second preset distance is less than or equal to 6 meters.

In one of embodiments, if determining that the strength of the control signal is less than or equal to preset strength, the control module controls the auxiliary working module to stop working.

In one of embodiments, the control module controls the self-moving device based on at least two preset signals to switch to the auxiliary working mode.

In one of embodiments, if the at least two preset signals received by the control module satisfy a preset condition, the control module controls the self-moving device to switch to the auxiliary working mode.

In one of embodiments, the preset condition comprises a preset time and/or a preset order.

In one of embodiments, the at least one preset signal is received by the wireless communication module.

In one of embodiments, the at least one preset signal comprises the control signal.

In one of embodiments, the self-moving device comprises an interaction module, and the at least one preset signal is generated by operating the interaction module by the user.

In one of embodiments, in the auxiliary working mode, the control module controls the auxiliary working module based on a stop signal to stop working.

In one of embodiments, the stop signal is received by the wireless communication module.

In one of embodiments, in the auxiliary working mode, the control module controls the moving module to move along a preset path.

In one of embodiments, the self-moving device comprises a path detection module, configured to detect the preset path, and the control module automatically controls a moving direction of the moving module according to an output of the path detection module.

In one of embodiments, the control module determines, according to the output of the path detection module, whether the self-moving device is on the preset path, and if the self-moving device is not on the preset path, controls the auxiliary working module to stop working.

In one of embodiments, the preset path comprises an inner boundary and/or an outer boundary of the working area.

In one of embodiments, in the auxiliary working mode, working energy of the auxiliary working module is less than 5 J.

In one of embodiments, in the auxiliary working mode, working energy of the auxiliary working module less than 2 J.

In one of embodiments, in the auxiliary working mode, a maximum moving speed of the moving module is less than 25 m/min.

In one of embodiments, in the auxiliary working mode, the maximum moving speed of the moving module is greater than 5 m/min.

In one of embodiments, the auxiliary working module comprises a trimmer head, the trimmer head is mounted with a trimmerline, and the trimmer head drives the trimmerline to rotate to cut grass.

In one of embodiments, the wireless communication module comprises a Bluetooth communication module.

In one of embodiments, if the auxiliary working module stops working, the control module controls the self-moving device to switch to the automatic working mode.

In one of embodiments, in the automatic working mode, the control module autonomously controls the moving module and the main working module.

In one of embodiments, in the automatic working mode, the control module controls the auxiliary working module not to work.

Another technical solution used in the present invention to resolve the problem in the prior art is:

An automatic working system, comprising a self-moving device and a user terminal, the self-moving device, moving and working in a working area, and comprising: a housing; a moving module, mounted to the housing, and configured to drive the housing to move; a main working module, mounted to the housing, and configured to perform a main working task; an auxiliary working module, mounted to the housing, and configured to perform an auxiliary working task; a control module, configured to control the moving module, the main working module, and the auxiliary working module; and a wireless communication module, configured to receive a signal sent by the user terminal; and the user terminal, comprising: an input module, for a user to operate to generate a signal; a processing module, configured to process the signal; and a remote communication module, configured to send the signal; the input module comprising a first input unit, configured to generate a control signal, the signal comprising the control signal;

the self-moving device comprises an automatic working mode and an auxiliary working mode, wherein in the auxiliary working mode, the control module controls the auxiliary working module at least based on the control signal to work; and the control module controls the auxiliary working module based on an interruption of the control signal to stop working.

In one of embodiments, the interruption of the control signal comprises that a time that the wireless communication module stops receiving the control signal is greater than a preset interruption time.

In one of embodiments, the preset interruption time is less than or equal to 3 seconds.

In one of embodiments, in the auxiliary working mode, if a distance between the wireless communication module and the remote communication module is less than or equal to a first preset distance, the control module controls the auxiliary working module to stop working.

In one of embodiments, the first preset distance is less than or equal to 20 meters.

In one of embodiments, in the auxiliary working mode, if the distance is greater than a second preset distance, the control module controls the auxiliary working module to reduce a working speed, to enable working energy of the auxiliary working module to be less than preset energy.

In one of embodiments, the second preset distance is less than or equal to 6 meters.

In one of embodiments, the input module comprises a second input unit, configured to generate a start signal.

In one of embodiments, the processing module controls the remote communication module based on the start signal to send the control signal.

In one of embodiments, if the control signal and the start signal received by the processing module satisfy a preset condition, the remote communication module is controlled to send the control signal.

In one of embodiments, the preset condition comprises a preset time and/or a preset order.

In one of embodiments, the control module controls the self-moving device based on the control signal to switch to the auxiliary working mode.

In one of embodiments, the processing module controls the remote communication module to send a start signal and a control signal.

In one of embodiments, the self-moving device comprises an interaction module, configured to generate a start signal.

In one of embodiments, the control module controls the self-moving device based on the start signal and the control signal to switch to the auxiliary working mode.

In one of embodiments, if the start signal and the control signal received by the control module satisfy a preset condition, the control module controls the self-moving device to switch to the auxiliary working mode.

In one of embodiments, the first input unit comprises a touch sensing button, touched by the user to generate the control signal.

In one of embodiments, the first input unit is connected to the processing module by a first connection circuit or a second connection circuit, and the first connection circuit is connected in parallel to the second connection circuit.

In one of embodiments, the input module comprises a third input unit, configured to generate a stop signal; and the control module controls the auxiliary working module based on the stop signal to stop working.

Compared with the prior art, the beneficial effects of this solution are as follows:

An auxiliary working module is mounted on a self-moving device, so that work such as trimming and pruning that originally requires holding of a device in hand by a user can be completed by the self-moving device, so that the user only needs to operate a user terminal, so that a working process is easier and more convenient. The user needs to operate the user terminal to perform the work of the auxiliary working module, to ensure that the work is performed in a supervised state of the user, so that it can be ensured that the user responds to an emergency that may occur, to improve the safety of operation.

BRIEF DESCRIPTION OF THE DRAWINGS

The foregoing objects, technical solutions, and beneficial effects of the present invention can be implemented with reference to the accompanying drawings below.

DETAILED DESCRIPTION

Specific implementations of the present invention are described below in detail with reference to the accompanying drawings.

Figure 1:
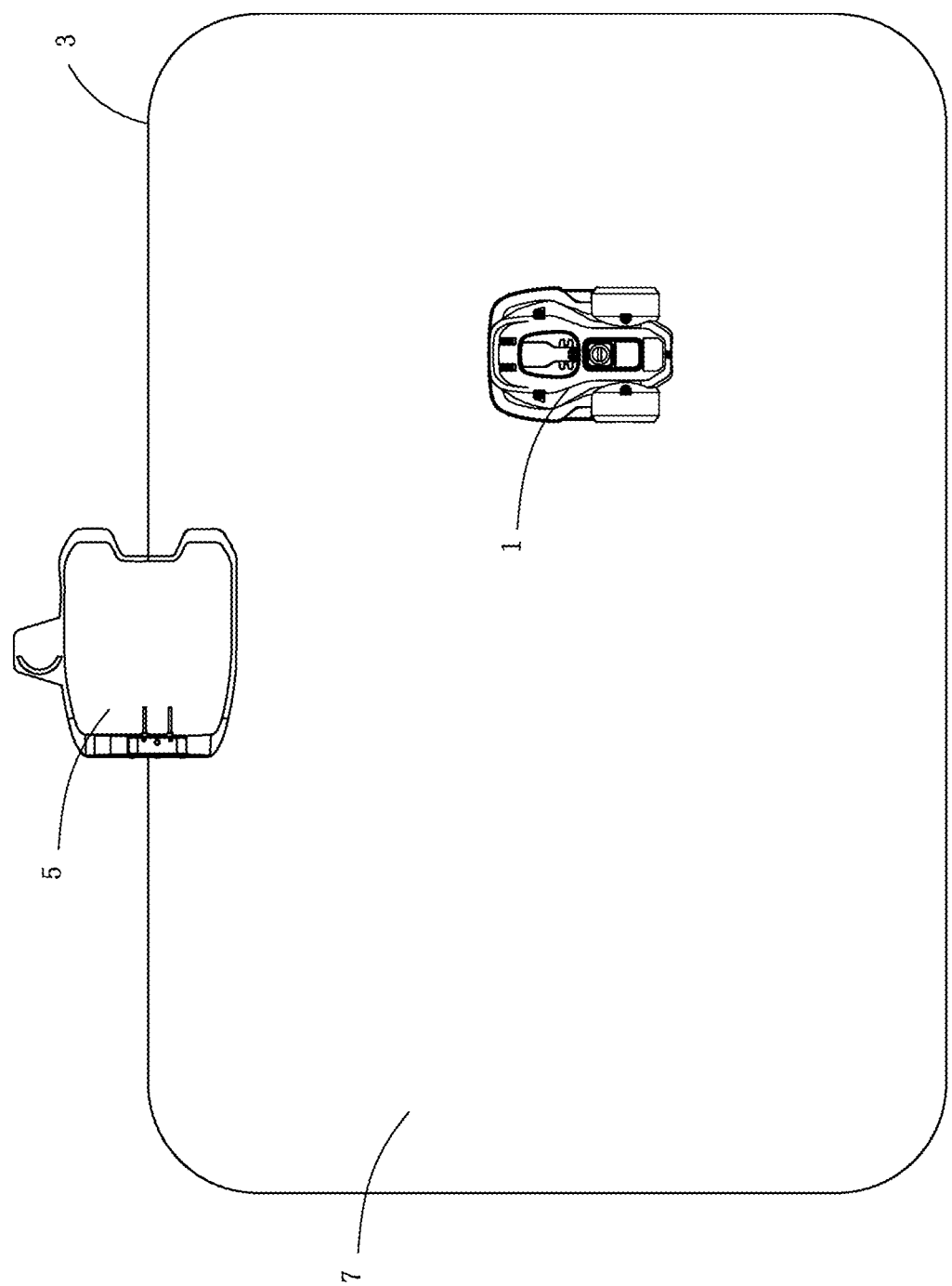
FIG. 1 is a schematic diagram of an automatic working system in an embodiment.

FIG. 1 shows an automatic working system. As shown in FIG. 1, in this implementation, the automatic working system includes a self-moving device 1, a boundary 3, and a parking station 5. The boundary 3 is configured to define a working area 7 of the automatic working system. The self-moving device 1 moves and works within the boundary 3. The parking station 5 is used for parking the self-moving device 1, especially, for the self-moving device to return to replenish energy when there is insufficient energy.

The boundary 3 may be an outer boundary of the working area 7. The outer boundary is a periphery of the entire working area 7, and is usually connected head to tail, to close the working area 7. The boundary 3 may be physical or may be electrical. That is, a wall, a fence, a handrail, or the like may form the boundary 3. A boundary signal generation apparatus may send an electromagnetic signal, an optical signal, or the like, and may be a passive magnetic apparatus that can generate a magnetic field. The boundary may be alternatively absolute coordinates or relative coordinates learned or recorded by the self-moving device 1, other environmental information that can be used for determining a position, or the like. The boundary 3 may be alternatively a general name of the outer boundary and an inner boundary of the working area 7. The inner boundary includes an obstacle in a working range or another area unsuitable for the self-moving device 1 to enter. The obstacle is a part or an area on which the self-moving device cannot move in the working range, and is, for example, an indoor couch or nightstand or an outdoor pond or flowerbed.

In this embodiment, the self-moving device 1 is a robotic mower. In other embodiments, the self-moving device 1 may be an unsupervised device such as an automatic vacuum cleaner, an automatic sprinkle device, or an automatic monitoring device. The device automatically moves on the ground or surface of the working area 7, to complete corresponding work. The self-moving device 1 includes a moving module, a main working module, a boundary detection module, an energy module, and a control module.

Figure 2:
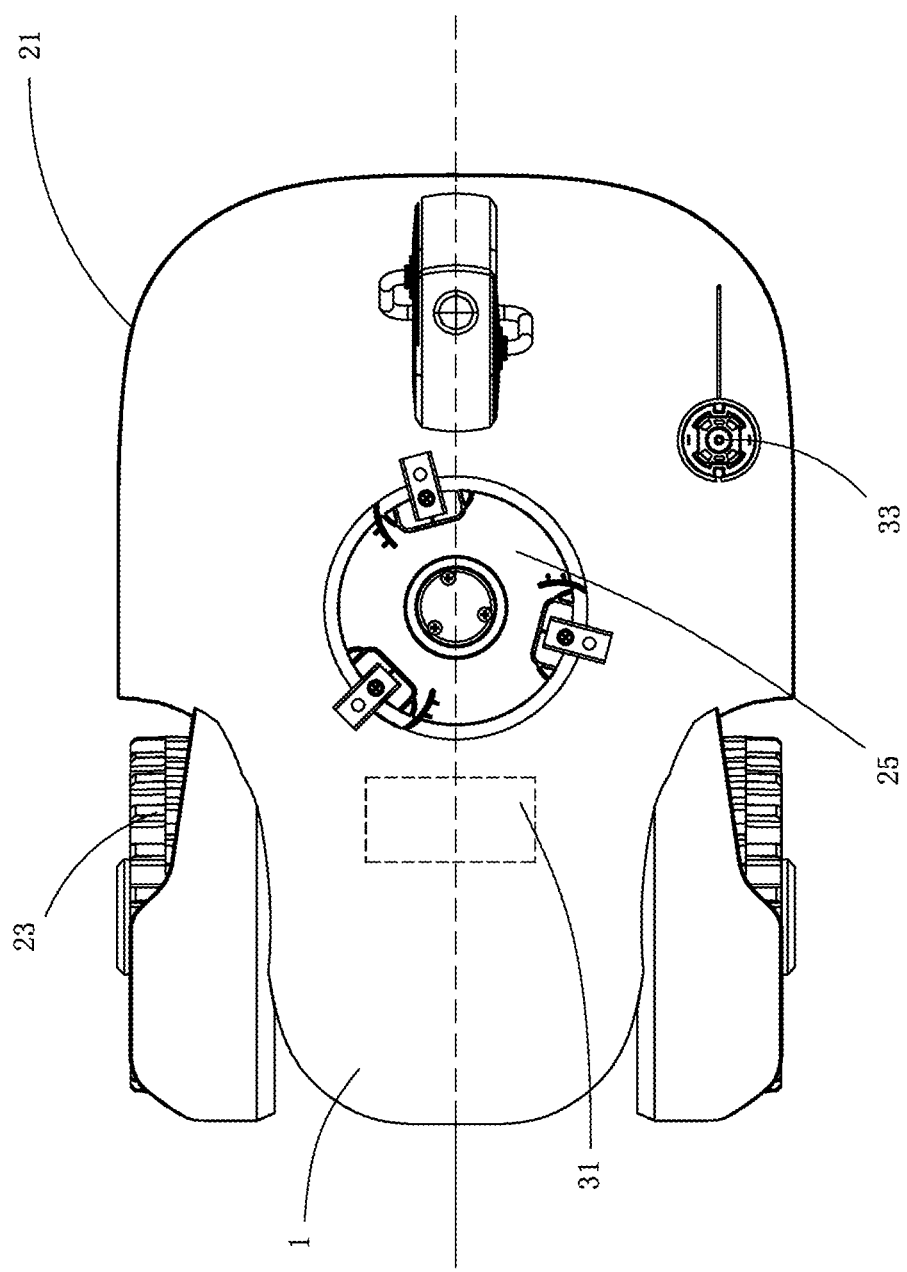
FIG. 2 is a schematic structural diagram of a self-moving device in an embodiment.

As shown in FIG. 2, a moving module 23 is configured to drive the self-moving device 1 to move in the working area 7, and is usually formed by a wheel group mounted to the self-moving device 1 and a moving motor configured to drive the wheel group. The wheel group includes a drive wheel connected to the moving motor and an auxiliary wheel mainly used for auxiliary support. In this embodiment, there are two drive wheels, located at the rear portion of the self-moving device 1. Each drive wheel is connected to the moving motor. There is one or two auxiliary wheels, located at the front portion of the self-moving device 1.

The main working module 25 is configured to perform a main working task of the self-moving device 1. If the self-moving device 1 is a robotic mower, the main working module includes a mowing blade, a cutting motor, and the like, or may include a part such as a mowing height adjustment mechanism that optimizes or adjusts the mowing effect. If the self-moving device 1 is an automatic vacuum cleaner, the main working module includes working parts such as a dust suction motor, a dust suction opening, a dust suction tube, a vacuum chamber, and a dust collection apparatus that are configured to perform a dust suction task.

The boundary detection module is configured to detect a relative position relationship between the self-moving device 1 and the boundary 3. The relative position relationship may specifically include one or more of a distance, an angle, and the inside and outside of the boundary 3. The boundary detection module may have various structures and principles, and may be, for example, of an infrared type, an ultrasound type, a collision detection type, a magnetic sensing type. A sensor and a corresponding signal generation apparatus of the boundary detection module also have various arrangement positions and quantities, and are related to a path planning manner.

The energy module is configured to supply energy for various work of the self-moving device 1, and includes a rechargeable battery and a charging connection structure. The charging connection structure is usually a charging electrode.

A control module 31 is configured to control the self-moving device 1 to automatically move and work, and is the core part of the self-moving device 1. The functions performed by the control module include: controlling the main working module to start working or stop, controlling the moving module to start or stop, controlling a moving direction, determining the energy of the energy module and instructing in time the self-moving device 1 to return to a charging station for automatic docking and charging, and the like. The control module usually includes a microcontroller, a memory, and another peripheral circuit.

In addition to the foregoing modules, the self-moving device 1 further includes a housing 21 for accommodating and mounting various modules, a control panel for operations by a user, and the like. The self-moving device 1 may further include various environmental sensors, for example, a humidity sensor, a temperature sensor, an acceleration sensor, and an optical sensor. These sensors may assist the self-moving device in determining a working environment, to execute a corresponding program.

In an embodiment, the self-moving device 1 includes an auxiliary working module 33, configured to perform an auxiliary working task of the self-moving device 1. Optionally, if the self-moving device 1 is a robotic mower. The auxiliary working module includes an auxiliary cutting module, a fertilization module, a fallen leaves collection module, or the like. If the self-moving device 1 is a cleaning robot, the auxiliary working module includes a watering module, a mopping module, or the like.

The parking station 5 is usually located in a working range, for example, near or on the boundary 3, and is connected to mains electricity or another electric power supply system, for the self-moving device 1 to return for charging. The charging electrode is disposed on the parking station 5, and is configured to be docked to a corresponding electrode of the self-moving device 1. Optionally, a wireless charging module instead of the charging electrode is disposed in the parking station 5, and the wireless charging module and a wireless charging module of the self-moving device 1 perform induction to implement wireless charging.

In an embodiment, the self-moving device 1 includes a main working mode and an auxiliary working mode. In the main working mode, the control module 31 autonomously controls the moving module 23 and the main working module 25. In the auxiliary working module, the control module 31 controls the auxiliary working module 33 based on a preset signal generated from an operation of a user to work.

Figure 9:
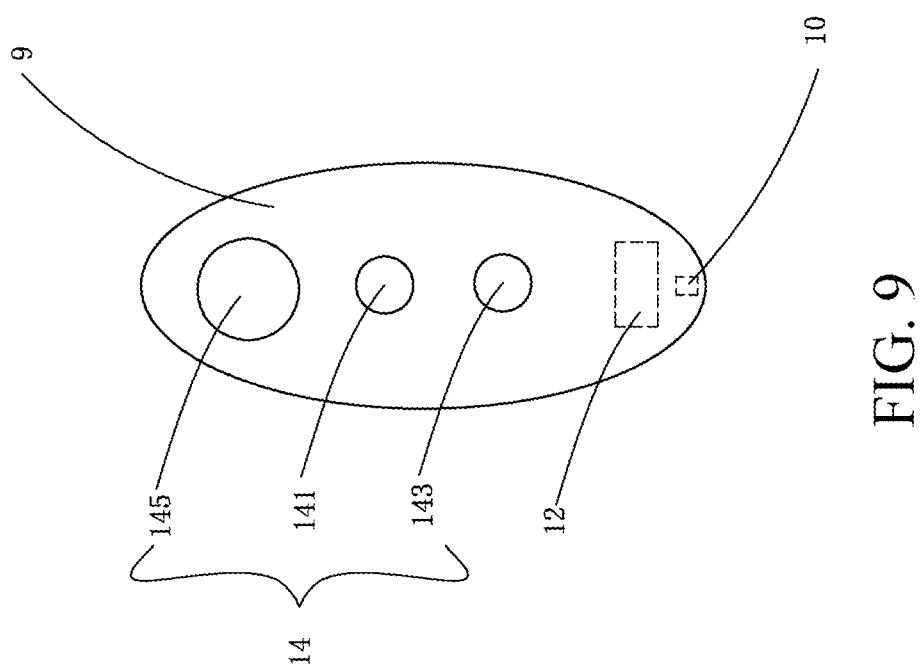
FIG. 9 is a schematic structural diagram of a user terminal in an embodiment.

FIG. 9 is a schematic structural diagram of a user terminal 9 in an embodiment. As shown in FIG. 9, the automatic working system includes the user terminal 9. The user terminal 9 may establish a communication connection with the self-moving device 1. The user terminal 9 includes a remote communication module 10, a processing module 12, and an input module 14. The input module 14 and the remote communication module 10 are respectively connected to the processing module 12. Optionally, the user terminal 9 further includes an indicator lamp 16, connected to the processing module, and configured to indicate a communication connection state. According to an actual requirement, several buttons may be disposed on the input module 14. The buttons correspond to different functions. The self-moving device 1 includes a wireless communication module, which may establish a communication connection with the user terminal 9 to receive a signal. The user terminal 9 may be an independent controller, or may be a control apparatus detachably connected to the self-moving device 1, or is a user terminal such as a mobile phone or a computer. A user operates the user terminal 9 to at least partially control the self-moving device 1 to work.

In an embodiment, the input module 14 includes: a first input unit, configured to generate a control signal; and a second input unit, configured to generate a start signal. Continuing to refer to FIG. 9, in an embodiment, the first input unit includes a button 141, and the second input unit includes a button 143. The button 141 is a start button for a user to operate to generate the start signal. The button 143 is a control button configured for the user to operate to generate the control signal. Optionally, the button 143 is a contact sensor, and detects the contact of the user on the user terminal 9 and generates the control signal, so that when holding the user terminal in hand in a normal gesture, the user can contact the contact sensor 143 to send the control signal. In this embodiment, the contact sensor is a capacitive sensor.

In an embodiment, the input module 14 includes a third input unit, in this embodiment, the third input unit includes a stop button 145, and generates a stop signal. The control module 31 stops the moving module 23 and the auxiliary working module 33 based on the stop signal.

In an embodiment, to prevent the button 143 and a signal transmission circuit or control circuit connected to a button from failing in a working process, the button 143 is connected to circuits of two independent channels. If the circuit of one channel fails, the circuit of the other channel can ensure normal control of the user. In another embodiment, the button 143 includes a button 1 and a button 2. If either of the button 1 and the button 2 fails, the other can still work normally, to ensure normal control of the user.

In an embodiment, if the user terminal 9 is in a working state, when the user presses the button 141 and the button 143, the start signal and the control signal are generated. The processing module 12 controls the remote communication module 10 to respectively send the start signal and the control signal. In a communication state, the wireless communication module receives the start signal and the control signal. The control module 31 controls the auxiliary working module 33 based on the start signal and the control signal to work.

In an embodiment, if the user terminal 9 is in a working state, when the user presses the button 141 and the button 143, the processing module 12 respectively receives the start signal and the control signal, and a preset condition is satisfied, the processing module 12 controls the remote communication module 10 to send the control signal. In this embodiment, the preset condition includes that the processing module 12 receives the start signal and the control signal within a preset time. The preset time may be 10 seconds, 20 seconds, or the like, and is set according to an actual requirement. In other embodiments, the preset condition includes the processing module 12 to receive the start signal and the control signal in a preset order. The control module 31 controls the auxiliary working module 33 based on the control signal to work. The preset order may be receiving the start signal first and then receiving the control signal; or may be receiving the control signal first and then receiving the start signal; or may be set to simultaneously receiving the start signal and the control signal.

In an embodiment, the self-moving device 1 includes an interaction module, for the user to operate to generate a signal. In this embodiment, the interaction module includes a start button disposed on the housing 21, and a control button is disposed on the user terminal 9. When the user operates the start button, the control module 31 receives the start signal, and when the user operates the control button, the user terminal 9 sends the control signal. The control module 31 receives the control signal by using the wireless communication module. If the start signal and the control signal received by the control module 31 satisfy the preset condition, the control module 31 controls the auxiliary working module 33 to work.

The wireless communication module includes an antenna. The antenna of the wireless communication module is disposed at an upper portion of the self-moving device 1, and optionally, is disposed at an upper portion of the auxiliary working module 33 to prevent interference from metal in a robotic mower 11, to avoid the impact on the sending and receiving of a signal by the wireless communication module.

In an embodiment, in the auxiliary working mode, the control module 31 at least controls the auxiliary working module 33 based on the control signal to work. If the control signal received by the control module 31 is interrupted, the control module 31 controls the auxiliary working module 33 to stop working.

In an embodiment, the interruption of the control signal is specifically that a time that the wireless communication module cannot receive the control signal is greater than a preset interruption time. In this embodiment, the preset interruption time is less than or equal to 3 seconds. According to an actual requirement, the preset interruption time may be 4 seconds, 5 seconds, or the like. Herein, a case that the wireless communication module cannot receive the control signal includes that the user releases a button of the user terminal 9, the user terminal 9 is disconnected from the self-moving device 1, the user terminal 9 is out of power, there is the blockage of an obstacle between the user terminal 9 and the self-moving device 1, or the like.

If the user continuously holds the user terminal 9 in hand and contacts the button 143, the user terminal 9 continuously sends the control signal, indicating that the user is in a control state. The control module 31 controls the auxiliary working module 33 according to the received control signal to work. If the control module 31 determines that the user terminal 9 has been started, the control module 31 controls the auxiliary working module 33 through an interruption of the control signal received by the wireless communication module to stop working. Optionally, the auxiliary working module 33 and the moving module 23 are controlled to stop working.

In an embodiment, if the control module 31 receives the stop signal, that is, the user presses the stop button 145, the control module 31 controls the auxiliary working module 33 to stop working. Optionally, the control module 31 controls both the auxiliary working module 33 and the moving module 23 to stop working.

In an embodiment, to ensure that the user performs control in a valid control range of the self-moving device 1, the control module 31 determines a distance between the user terminal 9 and the self-moving device 1 according to the received control signal, and if the distance between the user terminal 9 and the self-moving device 1 is greater than or equal to a preset distance, controls the auxiliary working module 33 to stop working. In this embodiment, the preset distance is less than or equal to 20 meters. That is, when a valid distance between the user terminal 9 and the self-moving device 1 is less than 20 meters, the user terminal 9 may control the self-moving device 1. When the valid distance between the user terminal 9 and the self-moving device 1 is greater than 20 meters, the control signal sent by the user terminal 9 cannot control the auxiliary working module 33 to work.

Figure 12:
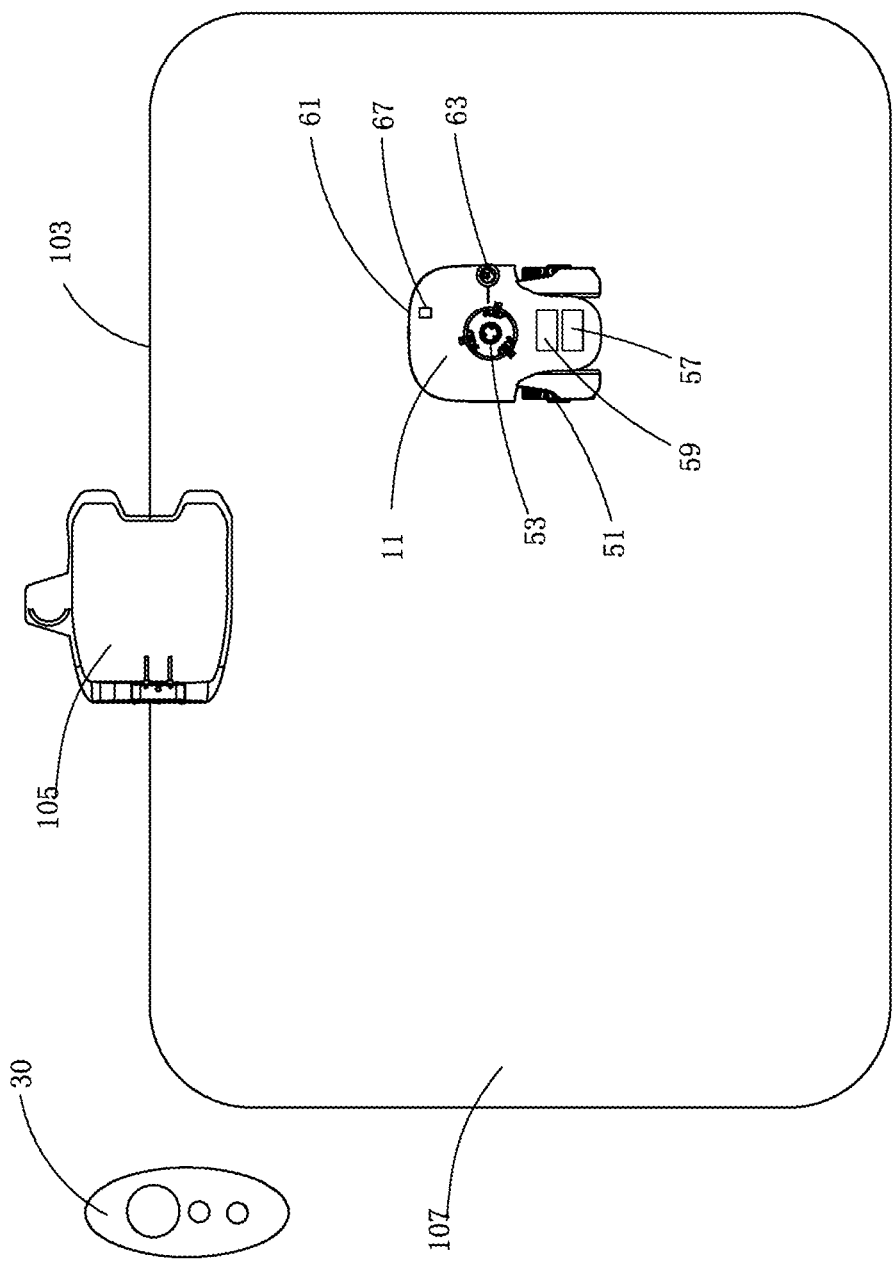
FIG. 12 is a schematic diagram of an automatic mowing system in an embodiment.

FIG. 12 is a schematic diagram of an automatic mowing system in an embodiment. As shown in FIG. 12, the automatic mowing system includes: a robotic mower 11; a parking station 105, for the robotic mower 11 to perform parking and charging; a boundary signal generator, located on the parking station 105, and generating a boundary signal; and a boundary line 103, connected to the boundary signal generator, where the boundary line 103 and the boundary signal generator form a closed ring, the boundary signal is provided on the boundary line 103, and a working area 107 of the robotic mower 11 is formed in the boundary line 103. The robotic mower 11 includes a housing 61, a moving module 51 mounted to the housing 61, a main cutting module 53, a boundary detection module, an energy module 57, and a control module 59.

The main cutting module 53 is a cutting deck, including a bottom disk rotating around an axis of a rotating shaft, where the bottom disk forms a plane perpendicular to the axis of the rotating shaft, an opening hole is provided at the center of the bottom disk, the opening hole is sleeved on the rotating shaft, and the rotating shaft is located at the center of the bottom disk; and further including a main cutting element disposed at a circumferential edge of the bottom disk, where the main cutting element rotates around the axis of the rotating shaft together along with the rotation of the bottom disk, and the bottom disk and the main cutting element rotate to form a main cutting area with the center of a coil disk as a first rotating axis.

A traveling direction of the robotic mower 11 is a longitudinal direction of the housing 61, a direction perpendicular to the ground is a vertical direction of the housing 61, and a direction perpendicular to both the longitudinal direction and the vertical direction is a transverse direction of the housing 61. The housing 61 includes a vertical axis 111 in the longitudinal direction, and the main cutting module 53 is mounted to the vertical axis 111 of the housing 61, so that there is a sufficient distance between a circumferential edge of the housing 61 and the main cutting module 53, to ensure the use safety of a user. If the robotic mower 11 moves along the boundary line 103 on an inner side of the boundary line 103, the main cutting area formed by the working of the main cutting module 53 may fail to cover a boundary of the working area 107.

In an embodiment, a boundary detection module includes a first boundary signal sensor and a second boundary signal sensor, symmetrically disposed at the front portion of the housing 61, and detecting a boundary signal to determine whether the sensor is located inside or outside the boundary line 103. If a detection result of the first boundary signal sensor shows that the sensor is outside the boundary line 103, it indicates that the robotic mower 11 has left the boundary line 103 on a side in which the first boundary signal sensor is located. In this case, the control module 59 controls the robotic mower 11 to steer. That is, the robotic mower 11 partially leaves the boundary line 103 and then steers. Generally, to prevent the robotic mower 11 from frequently colliding with an obstacle such as a wall, a fence, or a step or entering an area that does not requires working, a distance between the boundary line 103 disposed at an edge of the obstacle and the obstacle or another boundary is approximately 30 centimeters. If the robotic mower 11 is partially located inside the boundary line 103 and partially located outside the boundary line 103 when returning to the parking station 105, that is, returns across a line, the main cutting module 53 can only cut an area of approximately 10 mm outside the boundary line 103. Therefore, a to-be-trimmed area of approximately 20 mm left between the boundary line 103 and the obstacle is not processable by the robotic mower 11. In consideration of an extreme case, the robotic mower 11 can completely move along an obstacle such as a wall, a fence, or the like, and for the presence of the distance between the circumferential edge of the housing 61 and the main cutting area, the to-be-trimmed area cannot be completely processed. Therefore, if only the main cutting module 53 is mounted, the robotic mower 11 cannot implement cutting to edge.

Figure 3:
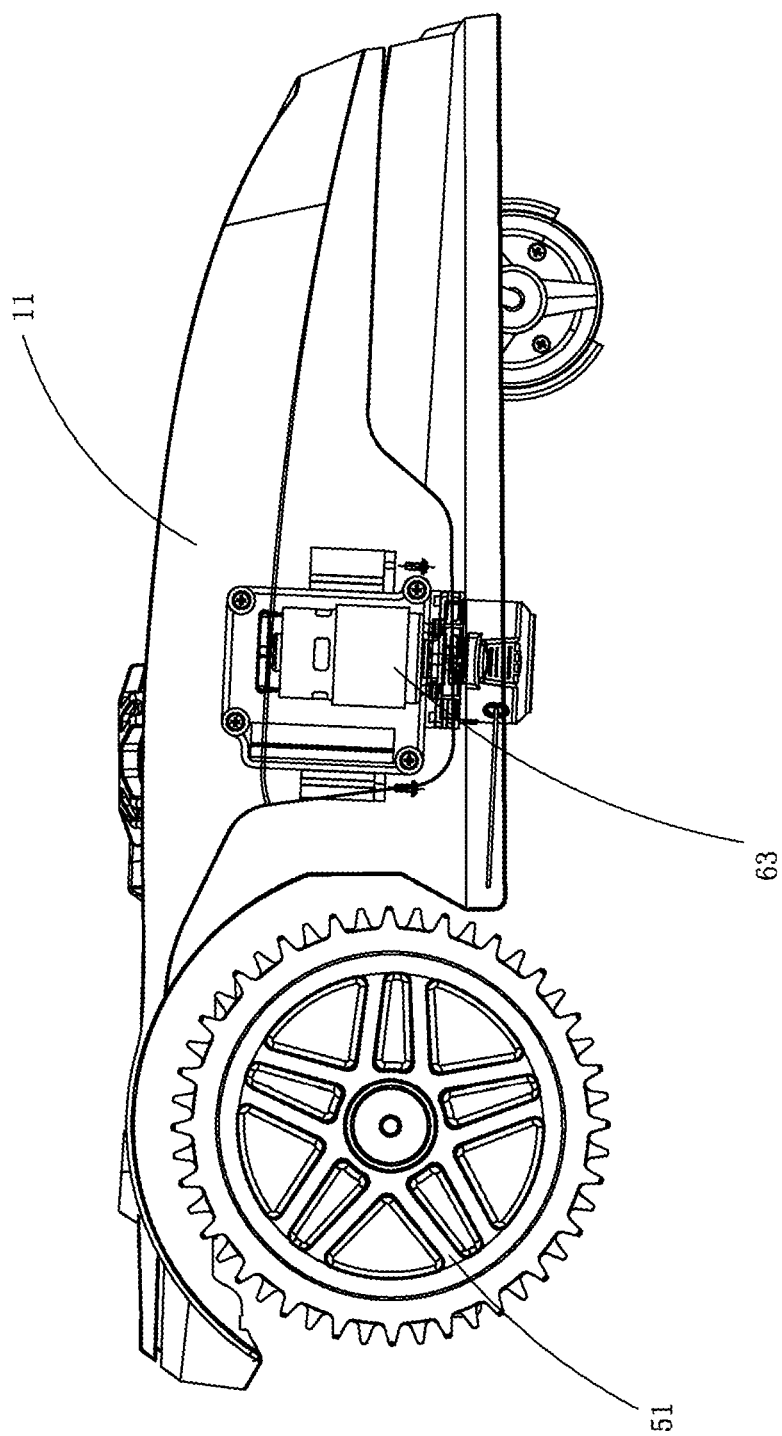
FIG. 3 is a schematic structural diagram of a robotic mower in an embodiment.

FIG. 3 is a schematic structural diagram of a robotic mower. As shown in FIG. 12 and FIG. 3, to resolve a problem that the main cutting module 53 cannot cut to edge, the robotic mower 11 further includes an auxiliary cutting module 63. In this embodiment, the auxiliary cutting module 63 includes a trimmer head, including a coil disk wound with a trimmerline, an accommodating base for accommodating the coil disk. When the trimmer head is working, the accommodating base is driven to rotate to drive the coil disk and the trimmerline to synchronously rotate, to form an auxiliary cutting area with the center of circle of the coil disk as a second rotating axis.

Grass cuttings generated from the working of the auxiliary cutting module 63 tend to be stuck on the housing 61, and water washing is an important manner to resolve this problem. Therefore, to prevent water from contacting the inside of the auxiliary cutting module in a water washing process to cause damage, a waterproof design needs to be applied to the auxiliary cutting module 63. Continuing to refer to FIG. 3, in an embodiment, the auxiliary cutting module 63 includes an auxiliary cutting motor, configured to drive the trimmer head to rotate. The auxiliary cutting motor is disposed in a motor protective cover. The motor protective cover prevents dust, rain, snow, or the like from causing damage to the operation of an electric motor, to ensure normal and continuous working of the electric motor. In this embodiment, the motor protective cover includes an outlet for an output shaft of the auxiliary cutting motor to extend out. Apart from the outlet, the motor protective cover is a sealed structure, that is, does not include a heat dissipation hole for the heat dissipation of the motor. Therefore, the material of the motor protective cover includes a thermal conduction material such as an aluminum shell. In this embodiment, there is a gap between the motor protective cover and the shell of the auxiliary cutting motor in the height direction for an air outlet of the auxiliary cutting motor to discharge an airflow, to implement airflow circulation in the motor protective cover. In an embodiment, the auxiliary cutting module 63 includes a heat dissipation fan, mounted below the motor protective cover, and used for auxiliary heat dissipation. In an embodiment, one side of the motor protective cover faces the main cutting module 53, and the other side faces the robotic mower 11. Therefore, the foregoing other side of the motor protective cover is provided with the heat dissipation hole, to assist the auxiliary cutting motor in heat dissipation. The foregoing side facing the main cutting module 53 is provided with no heat dissipation hole, to prevent grass cuttings generated during the working of the main cutting module 53 from entering the auxiliary cutting motor.

In an embodiment, a sealing member is disposed between the outlet of the motor protective cover and the output shaft of the auxiliary cutting motor, to further isolate the internal environment and the external environment of the motor protective cover while keeping that the output shaft of the auxiliary cutting motor normally rotate. In an embodiment, an electrically charged body in the auxiliary cutting module 63 is encapsulated for isolation from the external environment, including potting waterproof, for example, an epoxy resin potting compound; or surface coating waterproof, for example, conformal coating or nano-coating, and the like.

Figure 4:
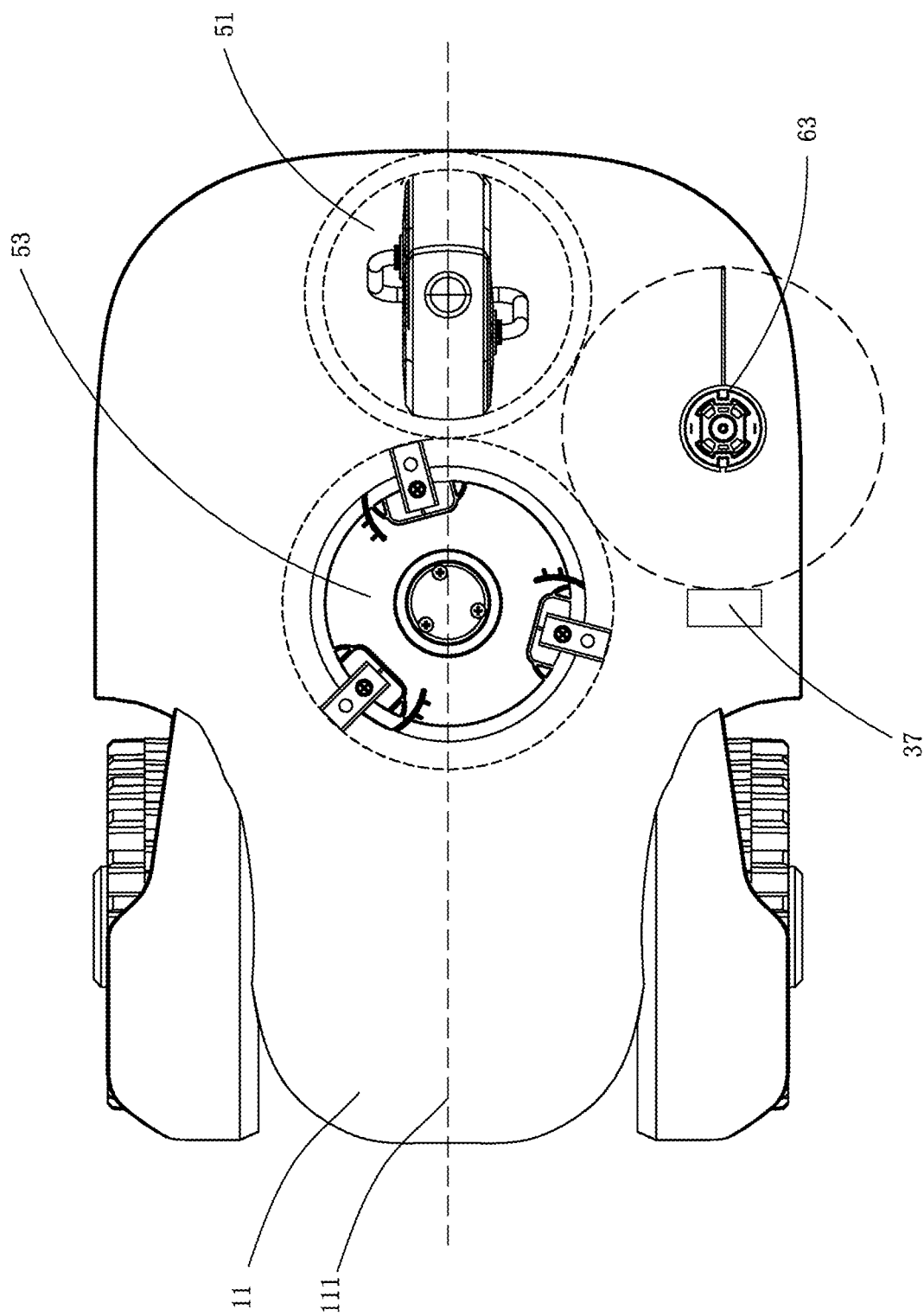
FIG. 4 is a schematic diagram of working areas of modules of a robotic mower in an embodiment.

FIG. 4 is a schematic diagram of working areas of modules of a robotic mower in an embodiment. As shown in FIG. 4, to implement that the robotic mower 11 can cut a to-be-trimmed area outside the boundary line 103 when moving along the boundary line 103, and the auxiliary cutting area formed by the working of the auxiliary cutting module 63 is tangent to the housing 61 or extends beyond the housing 61. If the moving module 51 is located in the housing 61 in the transverse direction, a distance between the second rotating axis and an outer edge of the housing 61 in the transverse direction is less than or equal to the radius of the auxiliary cutting area. If the moving module 51 is located outside the housing 61 in the transverse direction, a distance between the second rotating axis and an outer edge of the moving module 51 in the transverse direction is less than or equal to the radius of the auxiliary cutting area. In this way, the auxiliary cutting area extends beyond or is tangent to the housing 61 or the moving module 51. In this way, if the robotic mower 11 can move along an obstacle, the auxiliary cutting area can completely cover the surrounding of the obstacle. When the robotic mower 11 moves along the boundary line 103, provided that the auxiliary cutting area can cover the boundary line 103 or the to-be-trimmed area outside the boundary line 103 in the transverse direction, it can be implemented that the robotic mower 11 completely cuts to edge, and the user does not need to perform processing again. A side on which the auxiliary cutting module 63 is mounted on a left side or a right side of a moving direction of the robotic mower 11. If the auxiliary cutting module 63 includes two trimmer heads, the trimmer heads may be respectively mounted on the left side and right side of the moving direction of the automatic lawn mower 11, and the control module 59 may control one of the trimmer heads to work or both the trimmer heads to work. In other embodiments, cutting to edge can also be implemented with the auxiliary cutting area extending beyond the housing 61 in the longitudinal direction. In particular, for a case in which there is an obstacle in the working area 107, when the robotic mower 11 encounters an obstacle during travel, the robotic mower 11 does not need to change a movement manner, and the auxiliary cutting area extending beyond the housing 61 may cover an edge of the obstacle.

Figure 5:
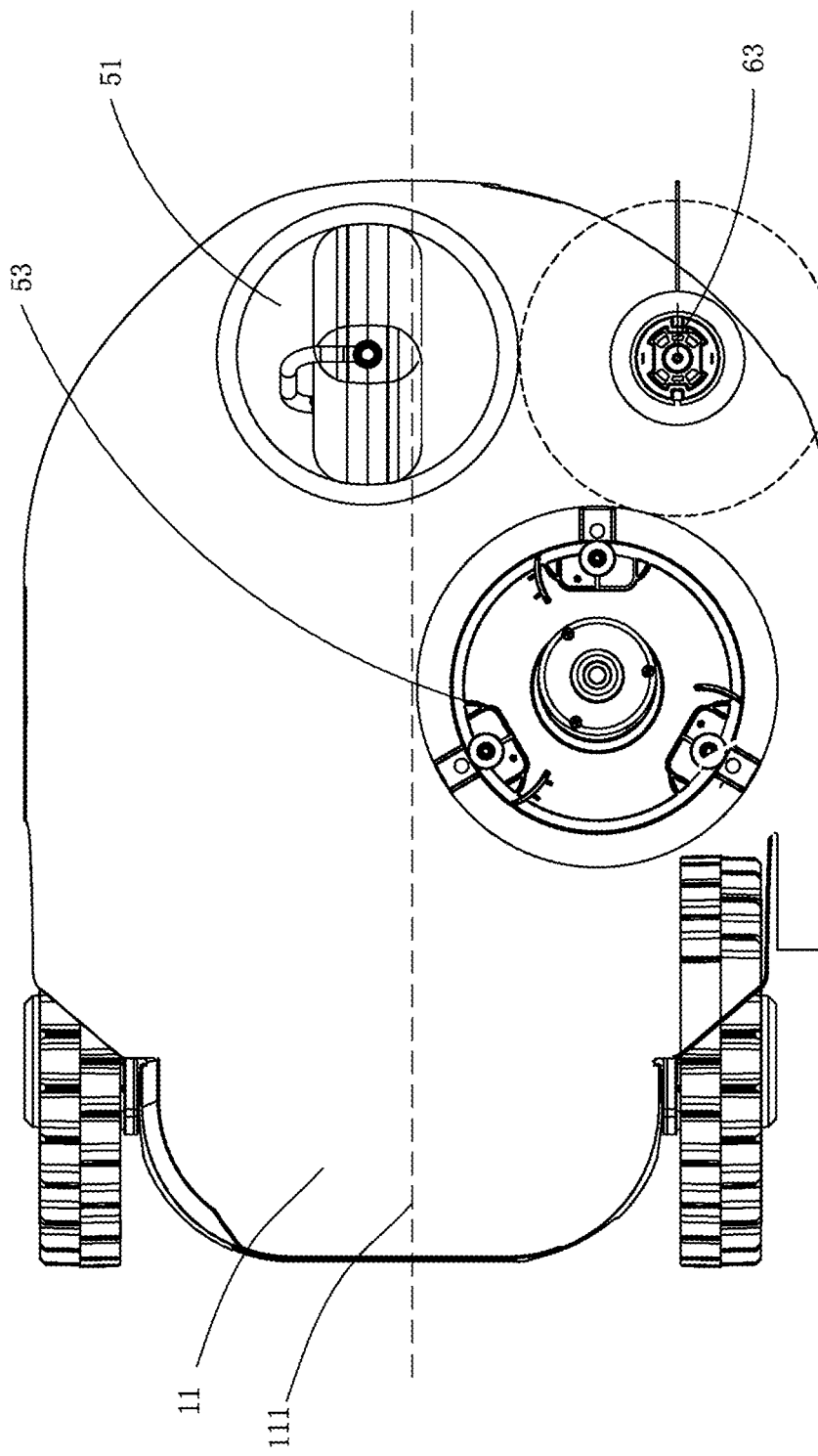
FIG. 5 is a schematic diagram of working areas of modules of a robotic mower in another embodiment.

FIG. 5 is a schematic diagram of working areas of modules of a robotic mower in another embodiment. As shown in FIG. 5, the main cutting module 53 is mounted to a side of the vertical axis 111 of the housing 61, so that the main cutting area can be closer to an obstacle, to cut an area that cannot be cut when the main cutting module 53 is mounted to the vertical axis 111. However, to avoid accidental injury, a protective cover is usually disposed on a side on which the user may contact the main cutting element, to ensure that the user cannot reach in and contact the main cutting element. As a result, there is still a distance between the main cutting module 53 and the protective cover, and even if the robotic mower 11 cuts along an obstacle, cutting to edge cannot be implemented. Therefore, the auxiliary cutting module 63 is also mounted to the same side of the vertical axis 111 of the housing 61. For example, the main cutting module 53 and the auxiliary cutting module 63 are both mounted to the right side of the moving direction of the robotic mower 11. The main cutting module 53 and the auxiliary cutting module 63 are mounted to the housing 61 in this manner, so that the main cutting module 53 can maximally cut to the proximity of the boundary of the working area 107, thereby reducing the workload of the auxiliary cutting module 63. Because the main cutting module 53 and the auxiliary cutting module 63 are mounted to the same side, to enable the main cutting module 53 and the auxiliary cutting module 63 to face the outer side of the working area 107, when the main cutting module 53 is working or the auxiliary cutting module 63 is working, the robotic mower 11 has a consistent moving direction when moving along the boundary line 103, does not need to change the direction.

Figure 6:
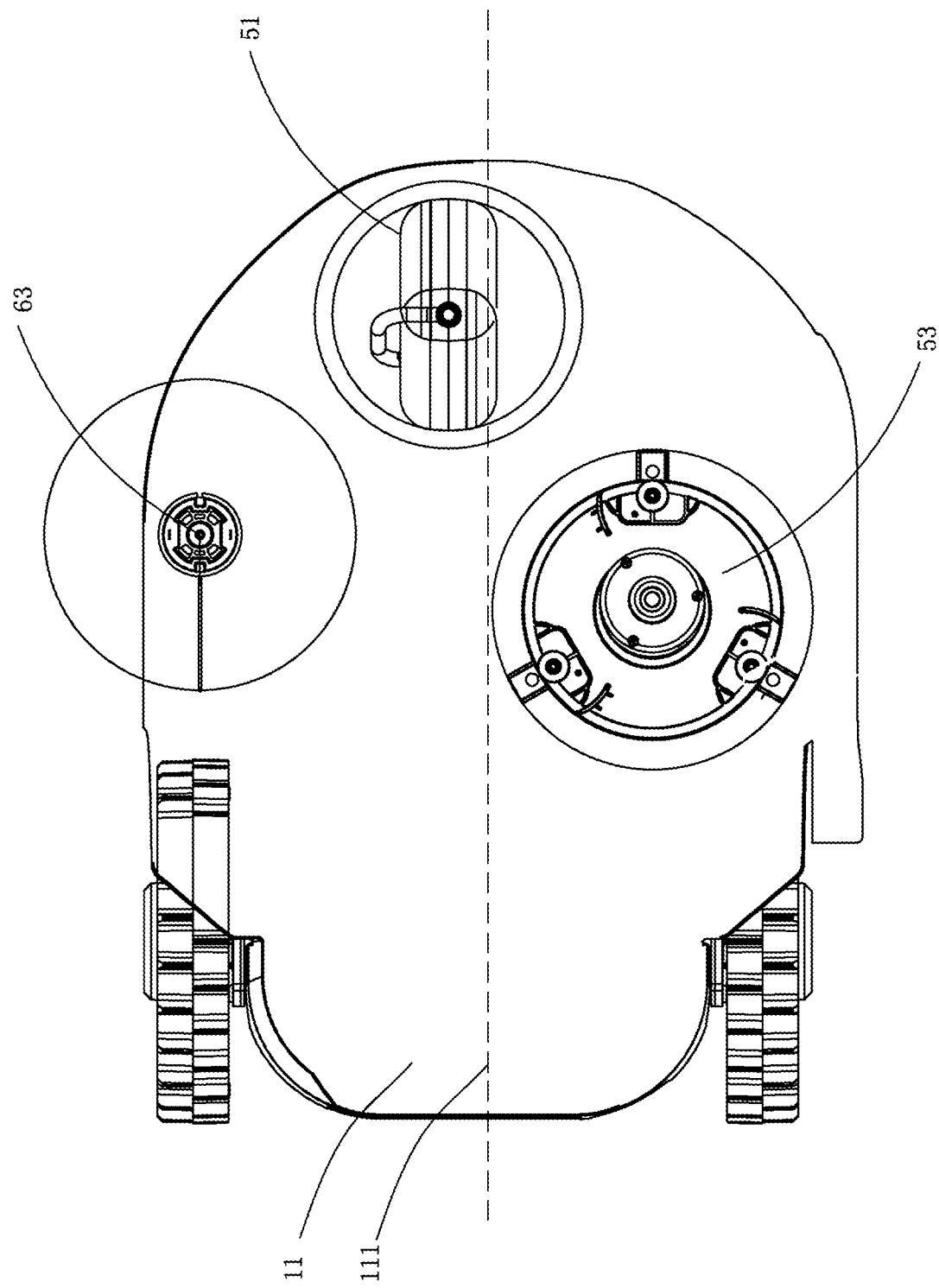
FIG. 6 is a schematic diagram of working areas of modules of a robotic mower in still another embodiment.

FIG. 6 is a schematic diagram of working areas of modules of a robotic mower in still another embodiment. As shown in FIG. 6, the main cutting module 53 is mounted on a side of the vertical axis 111 of the housing 61, and the auxiliary cutting module 63 is mounted on the other side of the vertical axis 111 of the housing 61. Because the main cutting module 53 and the auxiliary cutting module 63 are mounted to different sides of the vertical axis 111, the space of the housing 61 can be fully used, so that the modules of the robotic mower 11 have a more compact structural layout. To implement cutting to edge, when the main cutting module 53 is working, the direction in which the robotic mower 11 moves along the boundary line 103, and when the auxiliary cutting module 63 is working, the direction in which the robotic mower 11 moves along the boundary line 103 is opposite.

In an embodiment, an auxiliary cutting element of the auxiliary cutting module 63 is a trimmerline. When the trimmer head is working, working energy of the trimmerline is less than or equal to full energy, safe energy is less than or equal to 5 J, to prevent a human or an animal from injury in the case of contact. In this embodiment, the trimmerline is made of nylon. The working energy of the trimmerline is controlled within a safe range by limiting the material and shape of the trimmerline, a working speed of the trimmer head, and the like. In other embodiments, the trimmerline may be another flexible material, for example, made of resin or fiber. The auxiliary cutting module 63 may be a cutting apparatus other than the trimmer head, and may be alternatively a metal element, a plastic blade, or the like without a cutting edge, provided that it can be satisfied that the working energy of the auxiliary cutting element is less than the safe energy. In an embodiment, the safe energy is less than or equal to 2 J.

In an embodiment, when the auxiliary cutting module 63 is working, the maximum moving speed of the robotic mower 11 does not exceed a preset speed range. The moving speed of the robotic mower 11 is related to the working energy of the auxiliary cutting module 63. If the moving speed of the robotic mower 11 is excessively large, to reduce the possibility of cutting miss, the auxiliary cutting module 63 needs to work with relatively high working energy, and as a result the working safety is affected. In this embodiment, the preset speed range is less than or equal to 25 m/min.

If the moving speed of the robotic mower 11 is small, the working energy of the auxiliary cutting module 63 may be correspondingly reduced to improve the safety. However, an excessively low moving speed affects the working efficiency of the robotic mower 11, causes an increase in working time, and affects user experience. In an embodiment, the preset speed range is greater than or equal to 5 m/min.

In an embodiment, the drive wheel includes a wheel hub cap. The wheel hub cap has an approximately smooth surface and a groove depth of less than or equal to 5 mm. When the groove depth of the wheel hub cap is larger, grass cuttings are more prone to adhesion and need to be cleaned by the user. Therefore, the approximately smooth surface of the wheel hub cap can reduce the adhesion rate of grass cuttings. It may be understood that the surface, close to the auxiliary cutting module 63, of the housing 61 is approximately smooth.

In an embodiment, the housing 61 includes a bottom base and an upper cap mounted to the bottom base. Because a working area of the auxiliary cutting module 63 and an edge portion of the upper cap are overlapped in the height direction, to prevent the housing 61 from interfering with the working of the auxiliary cutting module 63, a height difference between the auxiliary cutting module 63 the housing 61 of the overlapped portion in the height direction and the plane in which the working area of the auxiliary cutting module 63 is located is greater than or equal to 5 mm.

In an embodiment, as shown in FIG. 6, the main cutting module 53 and the auxiliary cutting module 63 are respectively located on two sides of the vertical axis of the housing 61. A distance between the housing 61 on a side where the auxiliary cutting module 63 is located and the main cutting module 53 in the horizontal direction is greater than or equal to 180 mm, to prevent the user from putting a finger in to cause injury during the working of the main cutting module 53.

In an embodiment, the housing 61 includes a movable guard, mounted to the bottom base or the upper cap, and located on a side where the auxiliary cutting module 63 is located. When the auxiliary cutting module 63 is mounted to the housing 61, the movable guard moves upward, to prevent the working of the auxiliary cutting module from impact. When the auxiliary cutting module 63 is not mounted to the housing 61, the movable guard moves downward, to prevent the user from putting a hand or a foot in to contact the main cutting module 53. In other embodiments, when the auxiliary cutting module 63 is mounted to the housing 61, the part of the upper cap is detached from the housing 61. When the auxiliary cutting module 63 is not mounted to the housing 61, the part of the upper cap is mounted in the housing 61. In an embodiment, a maximum radius of the auxiliary cutting area is set. This maximum radius is less than or equal to a distance between the second rotating axis and another structure of the robotic mower 11. Continuing to refer to FIG. 4, a limiting element 37 is mounted to an edge of the auxiliary cutting area, and is configured to limit the length of the trimmerline, thereby limiting the maximum radius of the auxiliary cutting area. The auxiliary cutting module 63 is mounted to a side of the vertical axis 111 of the housing 61. Because the trimmerline is subject to relatively severe wear in a working process, the trimmer head is frequently uncoiled in the working process. That is, a segment of the trimmerline is uncoiled. Generally, the uncoiled trimmerline has a relatively fixed length. However, a conventional trimmer head uncoiling structure inevitably uncoils the trimmerline by a length greater than a normal length. In this case, during the working of the trimmer head, the trimmerline hits another structure such as the moving module 51 or the main cutting module 53 of the robotic mower 11, resulting in damage to a particular degree. In this embodiment, the limiting element 37 is mounted to the housing 61, and the limiting element 37 includes a blade, configured to cut off a trimmerline part exceeding a set length. The limiting element 37 limits the length of the trimmerline, to ensure the working areas of the auxiliary cutting module 63 and other modules do not interfere with each other.

In an embodiment, in the moving direction of the robotic mower 11, the auxiliary wheel is located on the front side, and the drive wheel is located on the rear side. The rear side of the auxiliary wheel and the rear side of the auxiliary cutting module 63 form an area A. A mounting height of the limiting element 37 is approximately parallel to the cutting area of the auxiliary cutting module 63, and the limiting element is located in the area A. In this embodiment, the limiting element 37 is mounted to the area A, and is close to the auxiliary wheel. When the robotic mower 11 encounters an obstacle, the auxiliary wheel encounters and moves over the obstacle before the limiting element 37, and the limiting element 37 located on the rear side of the auxiliary wheel can also move over the obstacle along with the auxiliary wheel. In other embodiments, the limiting element 37 is mounted to the area A and is close to the drive wheel. When the obstacle is located on the rear side of the robotic mower 11, the drive wheel is more likely to contact and move over the obstacle. The limiting element 37 can move over the obstacle accordingly, to avoid a collision. In other embodiments, the moving module 51 includes two drive wheels on the front side and two drive wheels on the rear side, but does not include an auxiliary wheel. The limiting element 37 is also located in the area A.

In an embodiment, the limiting element 37 is mounted to a movable structure, for example, an elastic structure. When the lawn mower encounters an obstacle, the limiting element 37 can be driven by the movable structure to avoid the obstacle. After the lawn mower leaves the obstacle, the limiting element 37 can automatically restore the original position. In an embodiment, the height of the limiting element 37 is greater than 30 millimeters. That is, a distance between the limiting element 37 and the horizontal ground is greater than 30 millimeters. In an embodiment, the auxiliary cutting module 63 includes a trimmer head, and the control module 59 controls the trimmer head to rotate backward. If the trimmer head is located on the left side of the housing 61, the control module 59 controls the trimmer head to rotate counterclockwise. If the trimmer head is located on the right side of the housing 61, the control module 59 controls the trimmer head to rotate clockwise. When the trimmer head rotates to perform cutting, grass cuttings moving in a corresponding rotating direction are generated. Therefore, if the trimmer head rotates forward, grass cuttings tend to accumulate on the front side of the robotic mower 11. After the robotic mower 11 moves forward, the trimmer head acts on the accumulated grass cuttings again, causing an increase in the workload of the trimmer head. Therefore, when the trimmer head rotates backward, the workload of the trimmer head can be reduced. Further, for the auxiliary wheel mounted below the housing 61, if grass cuttings accumulate on the auxiliary wheel, it is very difficult to discharge the grass cuttings. If the drive wheel is not covered by the housing 61, it is relatively easy to discharge grass cuttings. Therefore, when the trimmer head rotates backward, the moving module can be assisted in discharging grass cuttings, to prevent the movement of the robotic mower 11 from impact.

In an embodiment, an isolation cover is disposed between the main cutting module 53 and the auxiliary cutting module 63. The isolation cover at least partially covers the main cutting module 53, or at least partially covers the auxiliary cutting module 63, thereby preventing grass cuttings from entering the auxiliary cutting module 63 during the working of the main cutting module 53 or grass cuttings from entering the main cutting module 53 during the working of the auxiliary cutting module 63.

In an embodiment, the main cutting module 53 includes a blade disposed obliquely. The auxiliary cutting module 63 includes an obliquely disposed trimmer head or an obliquely disposed trimmerline, so that a tilt angle of the trimmerline during working is consistent with a tilt angle of the blade of the main cutting module 53, thereby keeping a cutting section surface after cutting by the auxiliary cutting module 63 consistent with a cutting section surface after cutting by the main cutting module 53, to obtain a better cutting effect. In an embodiment, the tilt angle is 3 degrees.

In an embodiment, the trimmer head is mounted with two trimmerlines, and there is a height difference between the trimmerlines in the vertical direction. When the trimmer head is working, the two trimmerlines respectively form a first cutting plane and a second cutting plane. If a lawn has a relatively large height, the first cutting plane and the second cutting plane may separately cut grass. Because the working frequency of the auxiliary cutting module 63 is lower than that of the main cutting module 53, the height of grass in a to-be-trimmed area is greater than grass in the working area 107. If the trimmer head is mounte with one trimmerline, grass cuttings after cutting by the trimmer head are relatively long. If the two trimmerlines are mounted to cut grass in the to-be-trimmed area, grass cuttings can be further reduced in size, to prevent scattered grass cuttings from affecting the beauty of a lawn or even affecting growth of the lawn.

In an embodiment, the control module 59 determines, by detecting a working parameter of the trimmer head, a length by which the trimmerline protrudes from the trimmer head. If it is determined that the length is less than a threshold, the trimmer head is controlled to automatically uncoil, that is, the trimmerline is automatically uncoiled by a particular length, so that the auxiliary cutting area restores the original working area. Specifically, parameters such as a working voltage of the trimmer head may be detected, and the control module 59 determines a relationship between the working voltage and the threshold, thereby controlling the trimmer head to uncoil.

In an embodiment, the trimmerline is wound around the coil disk mounted to the trimmer head. When the trimmerline on the coil disk is used up, the coil disk needs to be replaced with a new coil disk for use by the working of the trimmer head. The control module 59 detects the working parameter of the trimmer head to determine whether the trimmerline is used up, and if the trimmerline is used up, prompts a user to make a replacement. Specifically, the trimmer head includes a drive motor. A sensor is used to detect the rotational speed, current, power, or the like of the motor. When a measured signal of the drive motor of the trimmer head is less than a preset value, it is determined that the trimmerline is used up. When the control module 59 determines that the trimmerline is used up, a prompting apparatus such as a photoelectric module or the like mounted to the housing 61 may be used to make a prompt, or a wireless signal transmission manner may be used to transmit a line replacement prompt signal to a terminal device such as a mobile phone or a computer.

In an embodiment, the moving module 51 may move along the boundary line 103 in two directions, namely, a first direction for ensuring that the auxiliary cutting module 63 can cut to edge and a second direction opposite the first direction. The control module 59 controls the moving module 51 to move along the boundary line 103 in the first direction. When the robotic mower 11 moves in the first direction, the other side relative to the vertical axis 111 of one side on which the auxiliary cutting module 63 is mounted faces the outside of the working area 107, to enable the auxiliary cutting area to extend outside the boundary line 103 or the boundary line 103, thereby cutting an area that the main cutting module 53 cannot cut.

Figure 7:
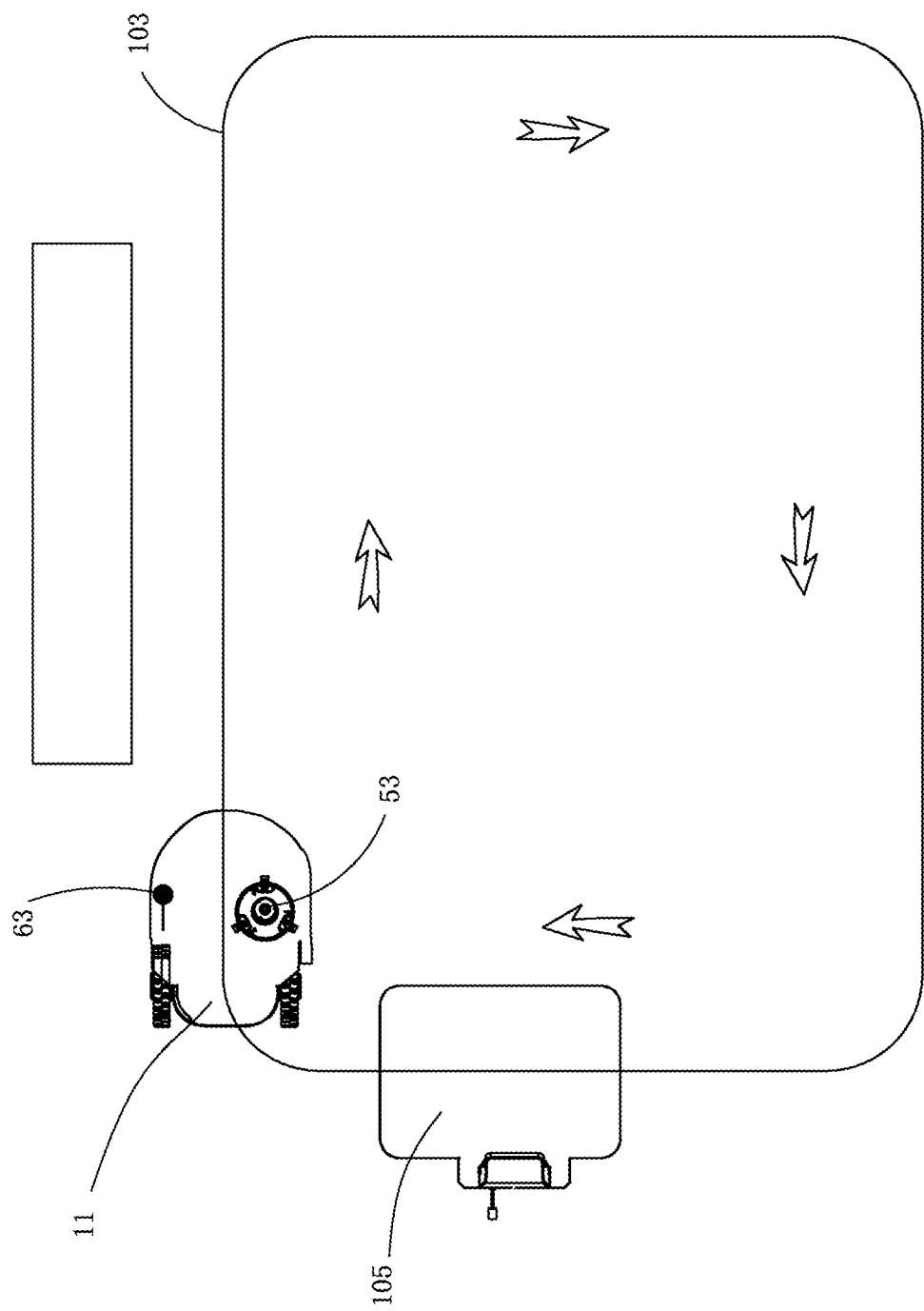
FIG. 7 is a schematic diagram of a moving direction of a robotic mower in an embodiment.

FIG. 7 is a schematic diagram of a moving direction of a robotic mower in an embodiment. As shown in FIG. 7, the auxiliary cutting module 63 is mounted to the left side of the vertical axis 111. The control module 59 needs to control the moving module 51 to move along the boundary line 103 in a clockwise direction. That is, along the boundary line 103, the clockwise direction is the first direction, and the counterclockwise direction is the second direction.

Figure 8:
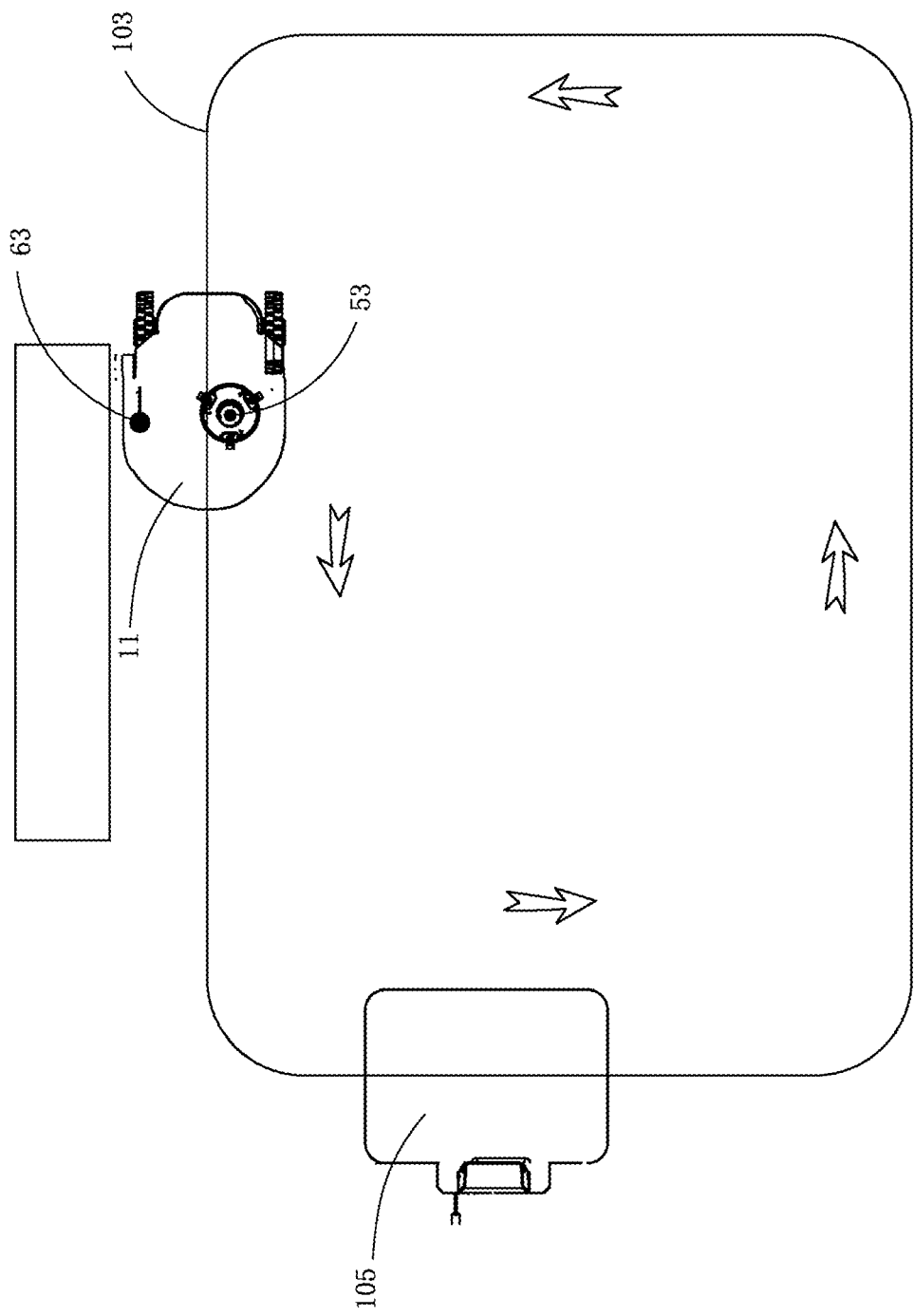
FIG. 8 is a schematic diagram of a moving direction of a robotic mower in still another embodiment.

FIG. 8 is a schematic diagram of a moving direction of a robotic mower in still another embodiment. As shown in FIG. 8, the auxiliary cutting module 63 is mounted to the right side of the vertical axis 111. The control module 59 needs to control the moving module 51 to move along the boundary line 103 in a counterclockwise direction. That is, along the boundary line 103, the counterclockwise direction is the first direction, and the clockwise direction is the second direction.

Continuing to refer to FIG. 12, in an embodiment, the boundary detection module includes a first magnetic field sensor and a second magnetic field sensor. The first magnetic field sensor and the second magnetic field sensor detect magnetic field signals generated from currents in the boundary line 103, to determine whether the sensor is located inside the boundary line 103 or outside the boundary line 103. The first magnetic field sensor is mounted to the left side of the vertical axis 111, and the second magnetic field sensor is mounted to the right side of the vertical axis 111. To control the direction in which the robotic mower 11 moves along the boundary line 103 to be the clockwise direction, the control module 59 needs to control the first magnetic field sensor to be located outside the boundary line 103 and the second magnetic field sensor to be located inside the boundary line 103. To control the direction in which the self-moving lawn mower 11 moves along the boundary line 103 to be the counterclockwise direction, the control module 59 needs to control the first magnetic field sensor to be located inside the boundary line 103 and the second magnetic field sensor to be located outside the boundary line 103. In other embodiments, the control module 59 may determine, by using the magnetic field signal detected by the first magnetic field sensor and the second magnetic field sensor, whether the sensor is located inside or outside the boundary line 103, and may further control the robotic mower 11 by using the strength of the magnetic field signal to move along a side of the boundary line 103 and control the moving direction. Details are not described herein again.

Continuing to refer to FIG. 4, FIG. 5, and FIG. 6, in an embodiment, a distance between a first rotating axis and the vertical axis 111 is a first distance, and a distance from the second rotating axis to the vertical axis 111 is a second distance. A difference value between the second distance and the first distance is less than or equal to a sum of the radii of the main cutting area and the auxiliary cutting area. As the robotic mower 11 moves along the boundary line 103, an area after the main cutting module 53 works on a lawn is approximately an area a with a width equal to the diameter of the main cutting area, and an area after the auxiliary cutting module 63 works on the lawn is approximately an area b with a width equal to the diameter of the auxiliary cutting area. If the difference value between the second distance and the first distance is greater than the sum of the radii of the main cutting area and the auxiliary cutting area, there is a gap between the area a and the area b in the transverse direction. As a result, there is still an uncut area around the obstacle after the main cutting module 53 and the auxiliary cutting module 63 work. In this way, when the robotic mower 11 moves along the boundary line 103 in a specific manner and completes cutting, the control module 59 further needs to control a relative distance between the moving module 51 and the boundary line 103 according to the detection of the signal strength of the boundary line 103 by the boundary detection module, thereby implementing cutting in the uncut area. This working manner increases the load of the control module 59 and also reduces the working efficiency of the robotic mower 11. Therefore, when the difference value between the second distance and the first distance is less than or equal to the sum of the radii of the main cutting area and the auxiliary cutting area, the area a and the area b are tangent or intersect in the transverse direction, to ensure that after the main cutting module 53 and the auxiliary cutting module 63 work, complete cutting is implemented around the obstacle.

Figure 10:
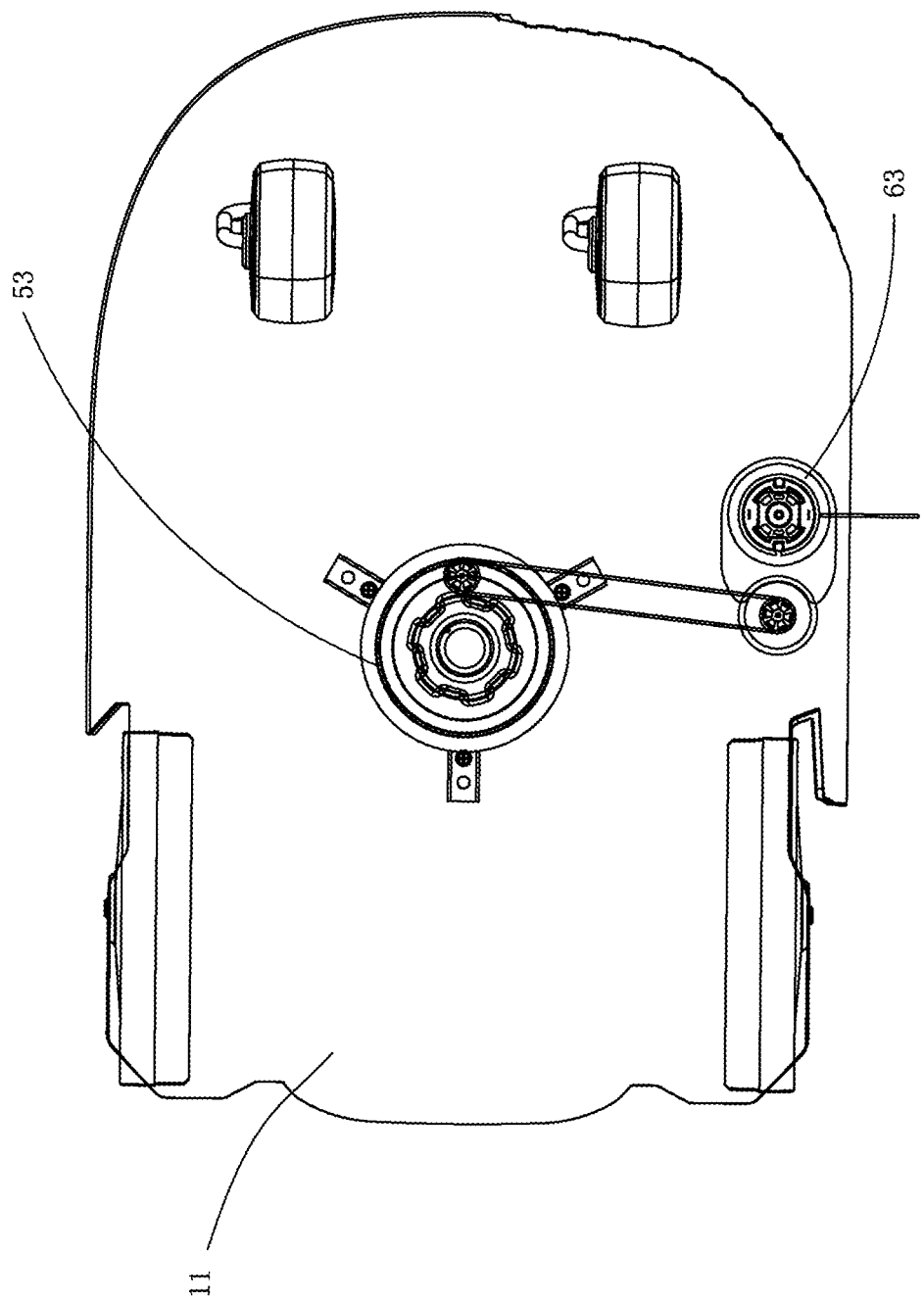
FIG. 10 is a schematic diagram of a height adjustment structure in an embodiment.

In an embodiment, to prevent the auxiliary cutting module 63 from contacting an uneven ground, the free movement of the robotic mower 11 is affected. The height of the auxiliary cutting module 63 is greater than or equal to 30 mm. That is, a distance between the auxiliary cutting module 63 and the horizontal ground is greater than or equal to 30 mm. FIG. 10 is a schematic diagram of a height adjustment structure in an embodiment. As shown in FIG. 10, the main cutting module 53 includes a main height adjustment module, configured to adjust the height of the main cutting module 53. Generally, the cutting height of the main cutting module 53 is between 20 millimeters and 100 millimeters. Users in different districts such as Europe and America have different requirements. To ensure the passability of the robotic mower 11 and adapt to the main cutting module 53, the cutting height of the auxiliary cutting module 63 is greater than or equal to 20 millimeters. In an embodiment, to obtain a cutting effect, the cutting height of the auxiliary cutting module 63 also cannot be excessively high, and to adapt to the main cutting module 53, the cutting height of the auxiliary cutting module 63 is less than or equal to 100 millimeters. If the maximum cutting height of the main cutting module 53 is 80 millimeters, the cutting height of the auxiliary cutting module 63 is less than or equal to 80 millimeters. In an embodiment, to ensure a visual effect, it is necessary to keep the cutting height of the auxiliary cutting module 63 and the cutting height of the main cutting module 53 within a particular range. Optionally, the cutting height of the auxiliary cutting module 63 is set to an average value of the minimum cutting height and the maximum cutting height of the main cutting module.

Continuing to refer to FIG. 10, in an embodiment, the auxiliary cutting module 63 includes an auxiliary height adjustment module, configured to adjust the height of the auxiliary cutting module 63. A height adjustment range of the auxiliary cutting module 63 is the same as that of the main cutting module 53. In an embodiment, the main height adjustment module and the auxiliary height adjustment module are in transmission connection by a transmission module, so that when the main height adjustment module adjusts the height of the main cutting module 53, the auxiliary height adjustment module can be driven to adjust the height of the auxiliary cutting module 63.

In an embodiment, during the working of the auxiliary cutting module 63, the main cutting module 53 is started in a preset manner, to prevent grass cuttings generated during the working of the auxiliary cutting module 63 from accumulating on the main cutting module 53. Therefore, the main cutting module 53 may be periodically started to rotate to make grass cuttings fall off. Alternatively, the main cutting module 53 may be started when it is detected that the weight is greater than a preset value or is started when a distance between the auxiliary cutting module 63 and the user terminal 9 satisfies a preset distance. In this embodiment, the control module 59 may control the main cutting module to be started at a normal working speed, or the main cutting module may be started at a higher or lower speed, provided that grass cuttings can fall off.

In an embodiment, the housing 61 is mounted with an alarm module. The alarm module may include an alarm lamp, a buzzer, or the like. During the working of the auxiliary cutting module 63, the control module 59 controls the alarm module to be started, thereby prompting a user, to avoid accidental contact with the auxiliary cutting module 63. The alarm module includes a sound alarm, a light alarm, or the like.

In an embodiment, during the working of the auxiliary cutting module 63, the strength of noise generated by the auxiliary cutting module 63 is greater than a preset noise strength, and the preset noise strength is greater than the strength of noise generated during the working of the main cutting module 53. In this embodiment, at a position one meter away from the auxiliary cutting module 63, the strength of the noise generated by the auxiliary cutting module 63 is greater than or equal to 60 dB.

In an embodiment, the robotic mower 11 may pass the parking station 105 when moving along the boundary line 103, leading to the contact between the auxiliary cutting element and the parking station 105, to damage the parking station 105 or damage the auxiliary cutting element. A trimmerline is used as an example. To reduce the wear of the trimmerline and damage to the parking station 105, a rounded corner design may be used for a partial surface of the parking station, to prevent the trimmerline from contacting an edge or a corner of the parking station 105.

In an embodiment, the height of the parking station 105 is lower than the height of the auxiliary cutting area during the working of the auxiliary cutting module 63. In an embodiment, for a plane in which the auxiliary cutting area is located, a distance between the parking station 105 and the second rotating axis is greater than the radius of the auxiliary cutting area, so that the auxiliary cutting element cannot contact the parking station 105.

In an embodiment, an automatic mowing system has at least two working modes: a main cutting mode and an auxiliary cutting mode. In the main cutting mode, the control module 59 automatically controls the robotic mower 11 to move and work in the boundary line 103, or move and work along the boundary line 103. In the auxiliary cutting mode, if continuously receiving a preset signal, the control module 59 controls the auxiliary cutting module 63 at least based on the preset signal to work. If the preset signal received by the control module 59 is interrupted, the control module 59 controls the auxiliary cutting module 63 to stop working. A user operates a user terminal 30 to indirectly control whether the auxiliary cutting module 63 works, to ensure that the user monitors and decides whether the auxiliary cutting module 63 works, so that the user can make a fast response to an abnormal case. In this way, even if the auxiliary cutting module 63 may accidentally contact a human or an animal in a working process, the user can perform monitoring to avoid an emergency.

Figure 13:
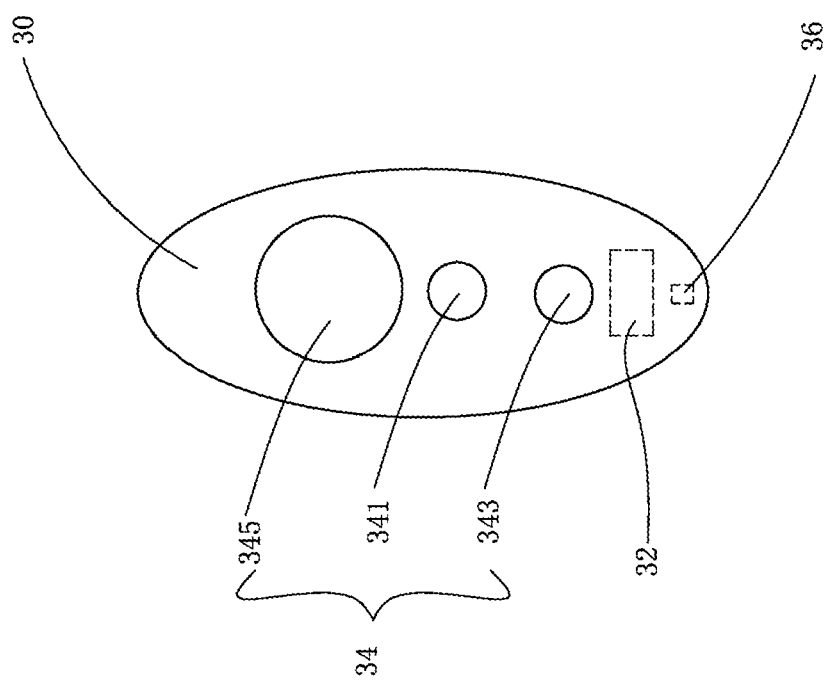
FIG. 13 is a schematic structural diagram of a user terminal in an embodiment.

FIG. 13 is a schematic structural diagram of a user terminal in an embodiment. As shown in FIG. 13, the user terminal 30 includes a remote communication module 36, a processing module 32, and a button 34. The button 34 includes a button 341 and a button 343. If the user respectively presses the button 341 and the button 343, a start signal and a control signal are generated. The processing module 32 sends the start signal and the control signal by using the remote communication module 36. The robotic mower 11 further includes a wireless communication module. If a connection is established between the remote communication module 36 and the wireless communication module, when receiving the start signal and the control signal by using the wireless communication module, the control module 59 controls the robotic mower 11 to start the auxiliary cutting mode. In this embodiment, a misoperation of the user can be avoided when two or two more buttons need to be pressed to start the auxiliary cutting mode. The auxiliary cutting mode may further be started in various manners such as voice input or password input.

In an embodiment, if the start signal and the control signal received by the control module 59 satisfy a preset condition, the robotic mower is controlled to switch to the auxiliary cutting mode. In this embodiment, the preset condition includes that the processing module 32 receives the start signal and the control signal within a preset time. In other embodiments, the preset condition includes that the processing module 32 receives the start signal and the control signal in a preset order.

In an embodiment, if the user terminal 30 is in a working state, when the user presses the button 141 and the button 143, the processing module 32 respectively receives the start signal and the control signal and the preset condition is satisfied, the processing module 32 controls the remote communication module 36 to send the control signal. When receiving the control signal, the control module 59 controls the robotic mower to switch to the auxiliary cutting mode.

In an embodiment, a start button is disposed in the housing 21, and a control button is disposed in the user terminal 30. When the user operates the start button, the control module 59 receives the start signal, and when the user operates the control button, the user terminal 30 sends the control signal. The control module 59 receives the control signal by using the wireless communication module. If the start signal and the control signal received by the control module 59 satisfy the preset condition, the control module 59 controls the robotic mower to switch to the auxiliary cutting mode.

If a communication connection is established between the user terminal 30 and the robotic mower 11, when the user continuously presses the button 343, the processing module 32 sends the control signal by using the remote communication module 36. In the auxiliary cutting mode, if the control module 59 continuously receives the control signal by using the wireless communication module, the control module 59 controls the auxiliary cutting module 63 to work. In the auxiliary cutting mode, the control module 59 continuously determines whether the control signal is received. If the control signal received by the control module 59 is interrupted, the control module 59 controls the auxiliary cutting module 63 to stop working.

Continuing to refer to FIG. 13, in an embodiment, the user terminal 30 includes a button 341 and a button 343, and further includes a button 345. When the user presses the button 345, the user terminal 30 sends a stop signal, and the control module 59 controls the auxiliary cutting module 63 according to the received stop signal to stop working.

In an embodiment, the button 343 is a contact sensor. The user may continuously contact the button 343 to implement the continuous operation of the button 343, so that the user terminal 30 continuously sends the control signal. When the user no longer contacts the button 343, the user terminal 30 no longer sends the control signal. Optionally, the button 341 and/or the button 345 may be alternatively a contact sensor. The contact sensor may be specifically a capacitive sensor, a piezoelectric sensor, or the like. In other embodiments, the user terminal 30 is completely or partially mounted with a capacitive sensor, so that when the user contacts a corresponding position of the user terminal 30, the capacitive sensor can detect an operation of the user. The user terminal 30 correspondingly sends a preset signal. When intending to stop the working of the auxiliary cutting module 63, the user may press the button 345 to enable the user terminal 30 to send the stop signal or may directly release the user terminal 30. In this embodiment, the contact sensor is used in place of a conventional button, so that it becomes more convenient for the user to continuously operate the user terminal 30. Optionally, the button 341 and/or the button 345 may be alternatively another inductive sensor, for example, an infrared sensor, or an acceleration sensor.

In an embodiment, the user terminal 30 includes a direction control button. The user operates the direction control button of the user terminal 30 to send a direction signal, and control a moving direction of the robotic mower 11. In this embodiment, when a distance between the user terminal 30 and the robotic mower 11 is less than a direction control distance, the user is allowed to control the moving direction of the robotic mower 11 by using the direction control button. In an embodiment, when the distance between the user terminal 30 and the robotic mower 11 is greater than the direction control distance, the control module 59 ignores the direction signal sent by the user terminal 30, that is, does not allow the user to control the moving direction of the robotic mower 11 by using the direction control button. In this embodiment, the direction control distance is 6 meters. Optionally, when receiving the direction signal sent by the user terminal 30, the control module 59 controls the auxiliary cutting module 63 to stop working.

In an embodiment, the user terminal 30 is a movement terminal. The user terminal 30 may be a terminal device that can be connected to a communication network based on the Internet Protocol and having a data sending function. Specifically, for example, a client may be a mobile smart phone, a computer (including a notebook computer, or a desktop computer), a tablet electronic device, a personal digital assistant (PDA), an intelligent wearable device, or the like.

Figure 14:
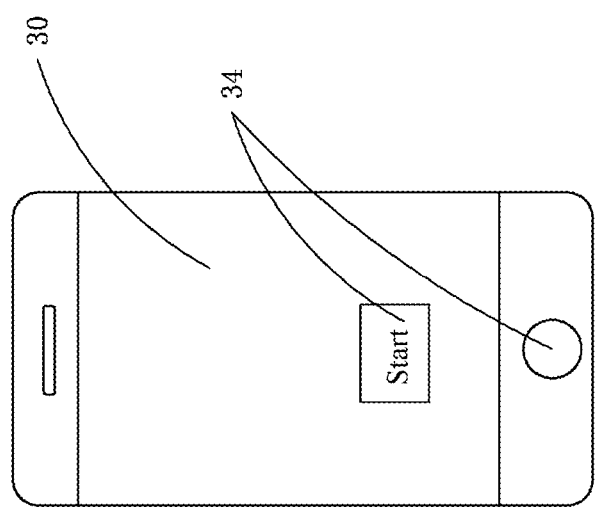
FIG. 14 is a schematic structural diagram of a user terminal in another embodiment.

FIG. 14 is a schematic structural diagram of a user terminal in another embodiment. As shown in FIG. 14, in an embodiment, the user terminal 30 is a movement terminal. The user may send a signal by operating a virtual button or a physical button by using the user terminal 30, and operates a specific button to send a signal to control the auxiliary cutting module 63 to work or stop working. In other embodiments, the user may send a signal by not operating a specific button to control the auxiliary cutting module 63. When the user holds the user terminal 30 in hand, the user terminal 30 uses an existing sensor to detect a state in which the user terminal is kept is not a stationary state. For example, the posture of the user terminal 30 is determined by using a compass or a gyroscope. If the posture continuously changes, the user terminal 30 sends the control signal, and the control module 59 controls the working of the auxiliary cutting module 63. If the posture remains unchanged, the user terminal 30 no longer sends the control signal, and the auxiliary cutting module 63 stops working. In another example, a camera is used to capture an image. If the image changes relatively frequently, the user terminal 30 sends the control signal, and the control module 59 controls the auxiliary cutting module 63 to work. If the image nearly does not change, the auxiliary cutting module 63 stops working. Provided that an existing sensor of the user terminal 30 can be used to detect a handheld state of the user to ensure that the robotic mower 11 works under the supervision of the user, the user terminal 30 can output the control signal by using the sensor to enable the control module 59 to control the auxiliary cutting module 63 to work.

In an embodiment, the user terminal 30 is the movement terminal, the user terminal 30 includes a pressure sensing module. When the pressure sensing module detects the pressing of a user, it is considered that the user is in a state of supervising the working of the robotic mower 11, and the user terminal 30 can send the control signal by using an output of a pressure sensor, so that the control module 59 controls the working of the auxiliary cutting module 63.

In an embodiment, the user terminal 30 is a movement terminal. The user terminal 30 includes an interface, configured to implement an electrical connection to an external device. The user terminal 30 may be connected to the external device by an interface. The external device may include an accelerator, a gyroscope, or the like. A user of the external device detects a supervised state of the user. The user terminal 30 sends the control signal by using a detection signal outputted by the external device, so that the control module 59 controls the auxiliary cutting module 63 to work.

In an embodiment, the user terminal 30 may further include an APP that is run on any foregoing listed device and has the function of sending an function instruction to the robotic mower 11. When the APP is switched to run in the background, the control signal sent by the user terminal 30 is stopped, and the control module 59 controls the auxiliary cutting module 63 to stop working. Alternatively, when the APP is switched to run in the background, the user terminal 30 sends a stop signal, and the control module 59 controls the auxiliary cutting module 63 to stop working. Alternatively, when the APP is switched to run in the background, the user terminal 30 sends a stop signal, and the control module 59 controls the auxiliary cutting module 63 and the moving module 51 to stop working. The APP being switched to run in the background includes the user terminal being in a call answering state, a short message reading state, or the like. In an embodiment, if a call is connected and the user hangs up within a particular time, the user terminal 30 is not affected by the operation. If the user does not hang up within a particular time, the user terminal 30 sends a stop signal to control the auxiliary cutting module 63 and/or the moving module 51 to stop working.

In an embodiment, the control module 59 determines a relationship between the strength of a signal sent by the user terminal 30 and a preset strength. If the strength of a signal received by the wireless communication module is less than a preset strength, the control module 59 controls the auxiliary cutting module 63 to stop working. In this case, the user continues to operate the user terminal 30. Although the user terminal 30 can send the control signal, the wireless communication module cannot receive the control signal, or even if the wireless communication module can receive the control signal, the control module 59 determines a state that the control signal is not received, that is, the control module 59 controls the auxiliary cutting module 63 to stop working. Herein, the strength of the signal is compared with the preset strength to keep the user terminal 30 and the robotic mower 11 within a particular distance, or parameters other than the strength of the signal may be used to determine a distance relationship. In other embodiments, the control module 59 determines the distance relationship between the user terminal 30 and the robotic mower 11 by using the control signal received by the wireless communication module. If a distance between the user terminal 30 and the robotic mower 11 is greater than a first preset distance, the auxiliary cutting module 63 is controlled to stop working.

In an embodiment, when the distance between the user terminal 30 and the robotic mower 11 is within different distance ranges, the auxiliary cutting module 63 has different working energy. When the working energy of the auxiliary cutting module 63 is relatively high, to ensure that the user can recognize an abnormal case in time and perform control by using the user terminal 30, the user terminal 30 and the robotic mower 11 need to be constrained within the first preset distance. If the distance between the robotic mower 11 and the user terminal 30 is less than the second preset distance, the control module 59 controls the auxiliary cutting module 63, to enable the working energy of the auxiliary cutting module 63 to be less than first preset energy. If the distance between the robotic mower 11 and the user terminal 30 is greater than the second preset distance and less than a first preset distance, the control module 59 controls the auxiliary cutting module 63 to reduce working energy, to enable the working energy of the auxiliary cutting module 63 to be less than second preset energy, and the second preset energy is less than the first preset energy. The first preset energy is 0.5 J, and the second preset energy is 0.25 J.

For a specific auxiliary cutting module, the working energy of the auxiliary cutting module is mainly affected by a working speed. In an embodiment, the auxiliary cutting module 63 has different working speeds in different cases. When the distance between the user terminal 30 and the robotic mower 11 is greater than the second preset distance, the working speed of the auxiliary cutting module 63 is low. When the distance between the user terminal 30 and the robotic mower 11 is less than the second preset distance, the working speed of the auxiliary cutting module 63 is high. In an embodiment, the working speed of the auxiliary cutting module 63 include at least two speeds: a first working speed and a second working speed. The first working speed is a high speed, and the second working speed is a low speed. The control module 59 determines a relationship between the distance between the user terminal 30 that sends the control signal and the remote communication module 36 and the second preset distance and the first preset distance, if the distance between the user terminal 30 and the robotic mower 11 is greater than the first preset distance, the user terminal 30 and the robotic mower 11 cannot establish a valid communication connection, and the control module 59 controls the auxiliary cutting module 63 to stop working. If the distance between the user terminal 30 and the robotic mower 11 is less than the second preset distance, the auxiliary cutting module 63 is controlled to work at the first working speed. If the distance is greater than the second preset distance and less than the first preset distance, the auxiliary cutting module 63 is controlled to work at the second working speed. If the distance is greater than the first preset distance, the auxiliary cutting module 63 is controlled to stop working. Because the auxiliary cutting module 63 works at the first working speed, the generated energy is relatively high, and a human or an animal may be injured. Therefore, when the user is relatively far away from the self-moving device 1, the auxiliary cutting module 63 works at the second working speed, and the generated energy is relatively low, to reduce or avoid injury. In this way, if the area of the working area 107 is relatively large, during the movement of the robotic mower 11, if the user does not move, the distance between the user and the robotic mower 11 exceeds the second preset distance. Through the switching between working speeds, it can be avoided that the auxiliary cutting module 63 frequently switches between a working state and a non-working state, and the user can further be prompted to adjust the position. In this embodiment, the first preset distance is 20 meters, and the second preset distance is 6 meters. In other embodiments, the values of the first preset distance and the second preset distance may be adjusted according to a safety requirement, the area of a working area, and the like.

In an embodiment, in the auxiliary cutting mode, if the user does not operate the user terminal 30 within a specified time or the distance between the user terminal 30 and the robotic mower 11 exceeds a preset distance, when the user terminal 30 returns to a valid distance of the robotic mower 11 or the user operates the user terminal 30 again to send the control signal, the control module 59 receives a valid control signal, so that the control module 59 controls the auxiliary cutting module 63 to continue working. If a time that the control module 59 cannot receive the valid control signal exceeds a specified time, the auxiliary cutting mode is switched to the main cutting mode. After the auxiliary cutting mode is interrupted, the user needs to operate the user terminal 30 to send a start signal to restart the auxiliary cutting mode.

In an embodiment, the robotic mower 11 includes a path detection module 67 that can detect a preset path set by the user. The control module 59 controls the robotic mower 11 by using an output signal of the path detection module 67 to move along the preset path. The so-called moving along the preset path may be that the moving module 51 is partially located on one side of the preset path and partially located on the other side of the preset path or may be that the moving module 51 is completely located on a side of the preset path. This is not specifically limited herein. The object of setting the preset path is to enable the auxiliary cutting module 63 to complete a corresponding working task in a corresponding area when the robotic mower 11 moves along the preset path. The control module 59 automatically controls the self-moving device by using an output of a sensor to move, and the user does not need to control the moving direction of the robotic mower 11. In this way, errors caused by the control of the user can be reduced, the degree of complexity of operations of the user can be reduced, and the degree of automation of the robotic mower 11 is maximized while the supervision of the user is ensured. In other embodiments, the preset path set by the user may be a part of the boundary line 103 or the boundary line 103, so that the control module 59 may control the moving module 51 by using an output of the boundary detection module to move along the preset path. The preset path may be a specific path set by the user in the working area 107 or may be a part of the boundary line 103 or the boundary line 103. If the preset path is a part of the boundary line 103 or the boundary line 103, the control module 59 may control the moving module 51 by using an output of the boundary detection module to move along the preset path. That is, the boundary detection module may be used as the path detection module 67 to output a detection result for determination by the control module 59. Specifically, the boundary line 103 includes an outer boundary line disposed on an outer side boundary of the working area 107 and an inner boundary line disposed on an inner side boundary of the working area 107.

In an embodiment, the controlling the moving module 51 to move along the preset path is specifically controlling the robotic mower 11 to move on the preset path. In the auxiliary cutting mode, the control module 59 determines whether the robotic mower 11 on the preset path. If the robotic mower is not on the preset path, the control module 59 controls the moving module 51 to move, and controls the robotic mower 11 by using an output of the path detection module 67 to approach the preset path. If the robotic mower 11 is on the preset path, the control module 59 controls the moving module 51 to move along the preset path.

In an embodiment, the preset path may include any one or more combinations of a physical path or an electrical path, and may be specifically a signal generation apparatus that generates a virtual signal, relative coordinates or absolute coordinates stored in the control module 59, and the like. For example, the preset path is set by using a magnetic material, and may be a magnetic nail or a magnetic strip. The shape of the magnetic strip may be adjusted according to a requirement of the user, to adapt to a working requirement of the auxiliary cutting module 63. Correspondingly, the path detection module 67 includes a sensor that detects a magnetic field generated by a magnetic material, and detects parameters such as the strength and direction of the magnetic field to enable the robotic mower 11 to move along the preset path.

In an embodiment, in the auxiliary cutting mode, if the control module 59 continuously receives the control signal, and the control module 59 determines that the robotic mower 11 is on the preset path, the auxiliary cutting module 63 is controlled to work. If the control module 59 continuously receives the control signal, and the control module 59 determines that the robotic mower 11 is not on the preset path, the auxiliary cutting module 63 is controlled to stop working. If the control signal received by the control module 59 is stopped, regardless of whether the robotic mower 11 is on the preset path, the control module 59 controls the auxiliary cutting module 63 to stop working. A position relationship between the robotic mower 11 and the preset path is determined to control the auxiliary cutting module 63, so that the invalid working time of the auxiliary cutting module 63 can be reduced, thereby saving the energy of the energy module 57 and improving the working efficiency. Moreover, the auxiliary cutting module 63 is restricted to work on the preset path only, thereby reducing a working range of the auxiliary cutting module 63, so that the possibility of causing accidental injury the auxiliary cutting module 63 can be reduced.

Figure 15:
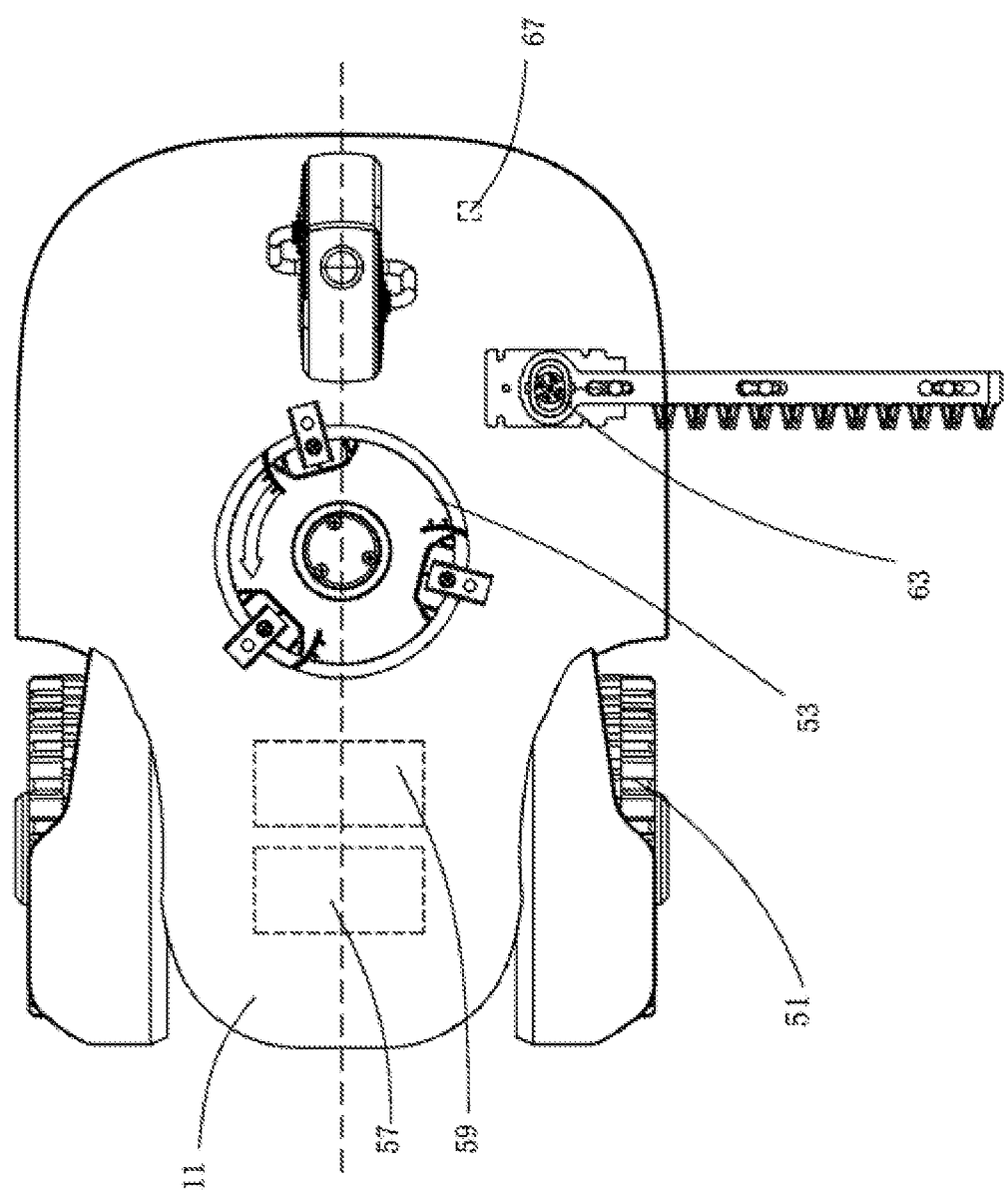
FIG. 15 is a schematic structural diagram of a robotic mower in an embodiment.

FIG. 15 is a schematic structural diagram of a robotic mower in an embodiment. As shown in FIG. 15, the auxiliary cutting module 63 includes a pruning module. When the robotic mower 11 moves along the preset path, the auxiliary cutting module 63 faces a to-be-pruned area, so that after moving along the preset path, the robotic mower 11 can complete pruning work of the to-be-pruned area. Therefore, the user can use the auxiliary cutting mode of the robotic mower 11 to complete with ease work that originally needs to be completed by the user holding pruning scissors in hand.

In an embodiment, the robotic mower 11 includes a prompting module. The prompting module stores an additional condition for starting the auxiliary cutting mode, and may include a working schedule of the robotic mower 11, the remaining energy of the energy module 57, and the like. If the prompting module determines that the additional condition is satisfied, a prompt signal is sent to the user terminal 30. The user may learn about the working state of the robotic mower 11 according to the prompt signal, to ensure more efficient manual control. The wireless communication module includes Bluetooth communication, Wi-Fi communication, cellular network communication, or the like.

Figure 11:
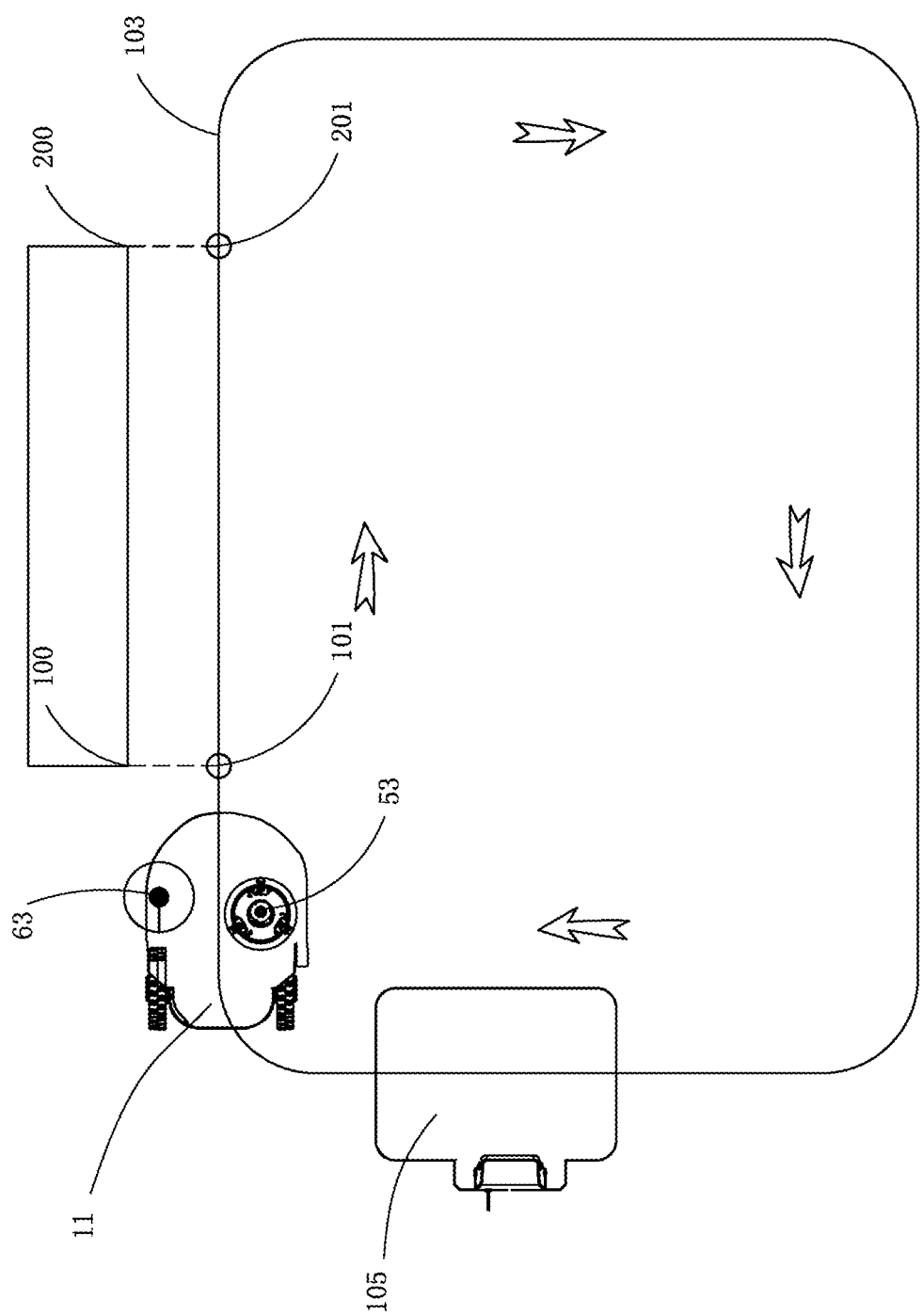
FIG. 11 is a schematic diagram of a position relationship between a robotic mower and an obstacle in an embodiment.

In an embodiment, the robotic mower 11 includes a trimming mode. FIG. 11 is a schematic diagram of a position relationship between a robotic mower and an obstacle in an embodiment. As shown in FIG. 11, the to-be-trimmed area includes at least a start point 100 and at least one end point 200. The user sets a first mark 101 corresponding to the start point 100 and a second mark 201 corresponding to the end point 200 on a boundary line 13 or within a particular range of the boundary line 13. The mark may be specifically a passive magnetic apparatus, a metal member, or the like. The robotic mower 11 is mounted with mark detection module, and is configured to detect the first mark 101 and the second mark 201. When the robotic mower 11 starts from a parking station 105 to move along the boundary line 13 in the first direction, if the mark detection module detects the first mark 101, the auxiliary cutting module 33 is controlled to work. If the mark detection module detects the second mark 201, the auxiliary cutting module 33 is controlled to stop working, so that the auxiliary cutting module 33 only works in the to-be-trimmed area. When the robotic mower 11 starts from the parking station 105 to move along the boundary line 13 in the first direction, a mark detected by the mark detection module first is the first mark 101, and a mark detected subsequently is the second mark 201. Because the to-be-trimmed area has a small range, a human or an animal is less likely to enter the to-be-trimmed area during the working of the robotic mower 11, and is less likely to injure a human or an animal during the working of the auxiliary cutting module 33.

Continuing to refer to FIG. 11, in an embodiment, the robotic mower 11 is mounted with a boundary detection module 27, and includes a distance detection module. A main direction detected by the distance detection module is the same as a facing direction of the auxiliary cutting module 33, that is, the auxiliary cutting module faces the outer side of a working area 107. In this embodiment, the to-be-trimmed area is an area between the boundary line 13 and an obstacle outside the boundary line 13. When the robotic mower 11 moves along the boundary line 13 and approaches the obstacle, the distance detection module may detect a distance between the robotic mower and the obstacle. When the robotic mower 11 moves along the boundary line 13 in the first direction, if the distance detected by the distance detection module is less than a preset distance, the control module 31 controls the auxiliary cutting module 33 to work. If the detected distance is greater than the preset distance, the control module 31 controls the auxiliary cutting module 33 to stop working.

Continuing to refer to FIG. 11, in an embodiment, the robotic mower 11 includes a boundary learning mode. In the boundary learning mode, the robotic mower 11 moves along the boundary line 13 in the first direction. The user performs an operation to enable the control module 31 to record a first point 101 and a second point 201 on a boundary line and a start point 100 and an end point 200 corresponding to the to-be-trimmed area. The robotic mower 11 includes a communication module, which is mounted to the housing 21 and may communicate with user equipment 9 and receive a signal. When the robotic mower 11 moves along the boundary line 13 in the first direction, if the robotic mower 11 passes the start point 100 of the to-be-trimmed area, the user operates the user equipment 9 to send a learning signal, to enable the control module 31 to record the first point 101 on the boundary line 13. If the robotic mower 11 passes the end point 200 of the to-be-trimmed area, and the user operates the user equipment 9 again to send a learning signal, to enable the control module 31 to record the second point 201 on the boundary line 13. In the trimming mode, when the robotic mower 11 moves along the boundary line 13 in the first direction, the control module 31 controls the auxiliary cutting module 33 to start working from the first point 101 and stops working when passing the second point 201. In other embodiments, to prevent a misoperation from changing the first point 101 and the second point 201 recorded by the control module 31, the user needs to input a password or use another manner to release the locking of the record before the user can change the record.

It is apparent to a person skilled in the art the present invention may further have other implementations. However, provided that the technical essence used in the implementations are the same as or similar to that in the present invention, any change or replacement made based on the present invention falls within the protection scope of the present invention.

What is claimed is:

1. A self-moving device comprising:
   a housing;
   a moving module, configured to drive the housing to move;
   a main working module, configured to perform a main working task;
   an auxiliary working module, configured to perform an auxiliary working task;
   a control module, configured to control the moving module, the main working module, and the auxiliary working module; and
   a wireless communication module, configured to receive a control signal generated from an operation of a user,
   wherein:
      the self-moving device is configured to operate in at least one of an automatic working mode or an auxiliary working mode, and wherein
      in the auxiliary working mode, the control module is further configured to:
         control the auxiliary working module to work based at least in part on the control signal,
         control the auxiliary working module to stop working based on an interruption of the control signal, and
         control a part of the auxiliary working module that faces outside a working area to rotate backward.

2. The self-moving device according to claim 1, wherein the interruption of the control signal comprises a time that the wireless communication module stops receiving the control signal being greater than a preset interruption time.

3. The self-moving device according to claim 1, wherein in the auxiliary working mode, if determining that a distance between a signal source of the control signal and the wireless communication module is greater than or equal to a first preset distance, the control module controls the auxiliary working module to stop working.

4. The self-moving device according to claim 3, wherein in the auxiliary working mode, if the distance between the signal source and the wireless communication module is greater than a second preset distance, the control module is configured to control the auxiliary working module to reduce a working speed, to enable a working energy of the auxiliary working module to be less than a preset energy; and the second preset distance is less than the first preset distance.

5. The self-moving device according to claim 1, wherein if determining that a strength of the control signal is less than or equal to a preset strength, the control module controls the auxiliary working module to stop working.

6. The self-moving device according to claim 1, wherein the control module is configured to control the self-moving device based on at least two preset signals to switch to the auxiliary working mode.

7. The self-moving device according to claim 6, wherein if the at least two preset signals received by the control module satisfy a preset condition, the control module is configured to control the self-moving device to switch to the auxiliary working mode, the preset condition comprising a preset time and/or a preset order.

8. The self-moving device according to claim 6, wherein at least one preset signal is received by the wireless communication module, the at least one preset signal comprising the control signal.

9. The self-moving device according to claim 6, wherein the self-moving device further comprises an interaction module, and at least one preset signal is generated by operating the interaction module by the user.

10. The self-moving device according to claim 1, wherein in the auxiliary working mode, the control module is configured to control the moving module to move along a preset path.

11. The self-moving device according to claim 10, wherein the self-moving device further comprises a path detection module, configured to detect the preset path, and the control module is further configured to automatically control a moving direction of the moving module according to an output of the path detection module.

12. The self-moving device according to claim 11, wherein the control module is further configured to determine, according to the output of the path detection module, whether the self-moving device is on the preset path, and if the self-moving device is not on the preset path, control the auxiliary working module to stop working.

13. The self-moving device according to claim 1, wherein in the auxiliary working mode, a working energy of the auxiliary working module is less than 5J.

14. The self-moving device according to claim 1, wherein in the auxiliary working mode, a maximum moving speed of the moving module is at least one of less than 25 m/min, or greater than 5 m/min.

15. The self-moving device according to claim 1, wherein the auxiliary working module comprises a trimmer head, the trimmer head is mounted with a trimmerline, and the trimmer head is configured to drive the trimmerline to rotate to cut grass.

16. The self-moving device according to claim 1, wherein if the auxiliary working module stops working, the control module is further configured to control the self-moving device to switch to the automatic working mode.

17. The self-moving device according to claim 1, further comprising: an isolation cover disposed between the main working module and the auxiliary working module, and configured to prevent grass cuttings from entering the auxiliary working module during working of the main working module, or prevent the grass cuttings from entering the main working module during the working of the auxiliary working module.

18. An automatic working system, comprising:
    a self-moving device comprising:
       a housing;
       a moving module, configured to drive the housing to move;
       a main working module, configured to perform a main working task;
       an auxiliary working module, configured to perform an auxiliary working task;

a control module, configured to control the moving module, the main working module, and the auxiliary working module; and
a wireless communication module, configured to receive a signal sent by a user terminal; and
the user terminal, comprising:
an input module, for a user to operate to generate a signal;
a processing module, configured to process the signal; and
a remote communication module, configured to send the signal, wherein:
the input module comprises a first input unit, configured to generate a control signal, the signal comprising the control signal,
the self-moving device is configured to operate in an automatic working mode or an auxiliary working mode,
in the auxiliary working mode, the control module is configured to:
control the auxiliary working module to work based at least in part on the control signal,
control the auxiliary working module to stop working based on an interruption of the control signal, and
control a part of the auxiliary working module that faces outside a working area to rotate backward.

19. The automatic working system according to claim 18, wherein the input module comprises a second input unit, configured to generate a start signal; and the processing module is configured to control the remote communication module to send the control signal based on the start signal.

* * * * *